United States Patent
Park et al.

(10) Patent No.: US 9,894,668 B2
(45) Date of Patent: Feb. 13, 2018

(54) METHOD FOR PERFORMING COMP OPERATION IN WIRELESS COMMUNICATION SYSTEM AND APPARATUS FOR THE SAME

(71) Applicant: LG Electronics Inc., Seoul (KR)

(72) Inventors: Kyungmin Park, Seoul (KR); Jian Xu, Seoul (KR); Daewook Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 14 days.

(21) Appl. No.: 15/114,980

(22) PCT Filed: Dec. 29, 2014

(86) PCT No.: PCT/KR2014/012954
§ 371 (c)(1),
(2) Date: Jul. 28, 2016

(87) PCT Pub. No.: WO2015/115737
PCT Pub. Date: Aug. 6, 2015

(65) Prior Publication Data
US 2016/0353457 A1    Dec. 1, 2016

Related U.S. Application Data

(60) Provisional application No. 61/934,702, filed on Feb. 1, 2014.

(51) Int. Cl.
*G01R 31/08* (2006.01)
*H04L 5/14* (2006.01)
(Continued)

(52) U.S. Cl.
CPC .......... *H04W 72/085* (2013.01); *H04B 7/024* (2013.01); *H04B 7/0417* (2013.01); *H04L 43/16* (2013.01); *H04W 24/08* (2013.01)

(58) Field of Classification Search
CPC ............. H04W 72/085; H04W 72/087; H04W 72/1215; H04W 72/002; H04W 28/00
See application file for complete search history.

(56) References Cited

U.S. PATENT DOCUMENTS

2012/0002636 A1* 1/2012 Xiao .................. H04B 7/024
370/329
2012/0282964 A1 11/2012 Xiao et al.
(Continued)

OTHER PUBLICATIONS

NSN, "Signalling framework for inter-eNB CoMP based on Coordinated Muting", R3-140181, 3GPP TSG-RAN WG3 Meeting #83, Prague, Czech Republic, Jan. 31, 2014.
(Continued)

*Primary Examiner* — Brian Roberts
*Assistant Examiner* — Abu-Sayeed Haque
(74) *Attorney, Agent, or Firm* — Morgan, Lewis & Bockius LLP

(57) ABSTRACT

The present invention discloses a method for performing a CoMP operation in a wireless communication system and an apparatus for the method. A method for performing an Inter-eNB CoMP (Coordinated Multi-Point) operation in a wireless communication system comprises receiving, by a first eNB, a message requesting initiation of a CoMP operation from a second eNB; transmitting, by the first eNB, to the second eNB a message requesting information about gain expected from a CoMP operation carried out in the second eNB; receiving, by the first eNB, the information about gain expected from the second eNB; coordinating, by the first eNB, resources for a CoMP operation based on the information of expected gain; and transmitting, by the first eNB, the resource coordination result to the second eNB.

10 Claims, 11 Drawing Sheets

(51) Int. Cl.
*H04B 1/56* (2006.01)
*H04B 7/00* (2006.01)
*H04J 3/00* (2006.01)
*H04W 72/08* (2009.01)
*H04B 7/024* (2017.01)
*H04B 7/0417* (2017.01)
*H04L 12/26* (2006.01)
*H04W 24/08* (2009.01)

(56) References Cited

U.S. PATENT DOCUMENTS

| | | | |
|---|---|---|---|
| 2013/0114524 A1* | 5/2013 | Sirotkin | H04L 1/0026 370/329 |
| 2013/0176953 A1* | 7/2013 | Stern-Berkowitz | H04W 52/146 370/329 |
| 2013/0258890 A1 | 10/2013 | Li et al. | |
| 2015/0215932 A1* | 7/2015 | Wang | H04W 72/0426 370/329 |

OTHER PUBLICATIONS

Samsung, "Interface alternatives for Inter-eNB CoMP", R3-140153, 3GPP TSG RAN WG3 Meeting #83, Prague, Czech Republic, Jan. 31, 2014.
Samsung, "Evaluation of coordinated scheduling for CoMP scenario 2 with non-ideal backhaul", R1-134870, 3GPP TSG RAN WG1 Meeting #74bis, Guangzhou, China, Oct. 9, 2013.
International Search Report dated Mar. 6, 2015, for International Patent Application No. PCT/KR2014/012954.

* cited by examiner

[FIG. 1]
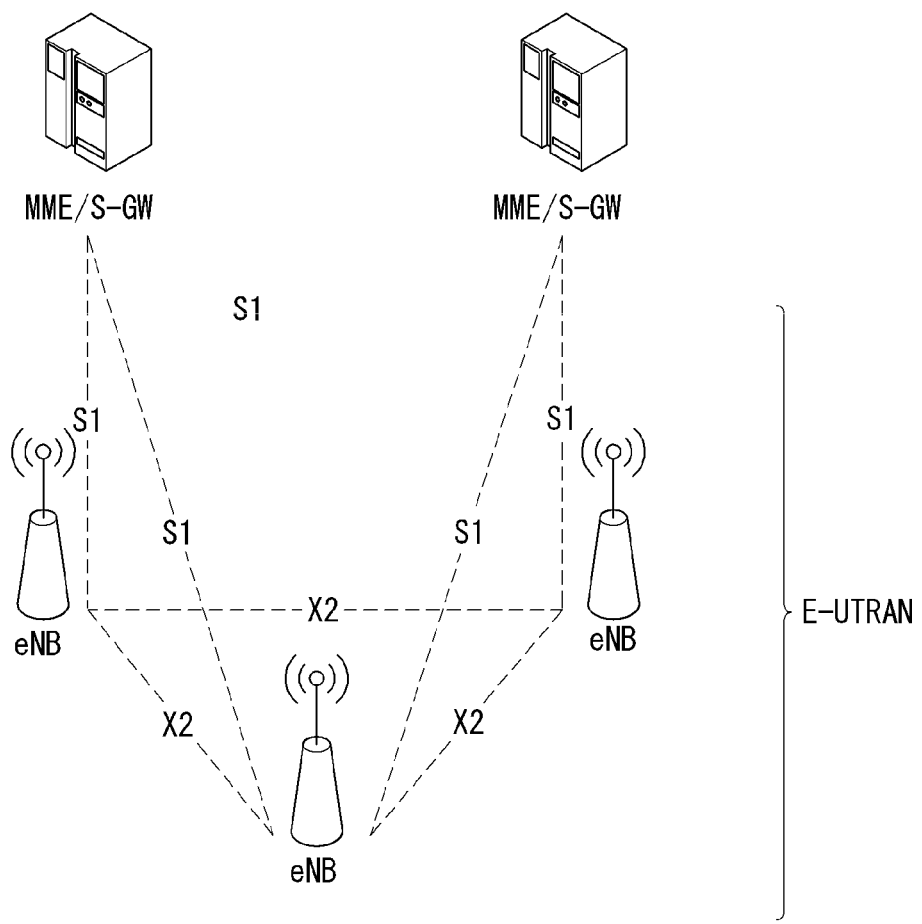

[FIG. 2]
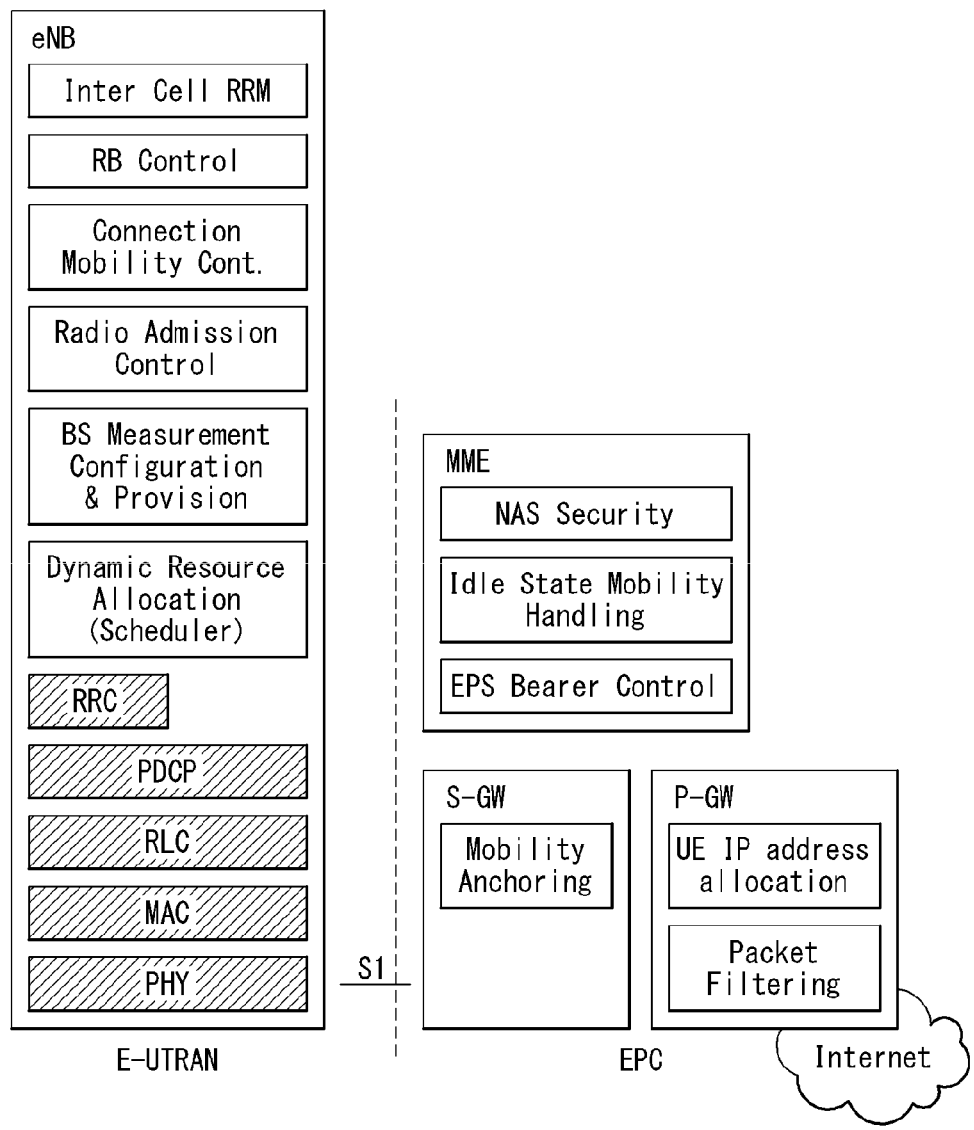

[FIG. 3]
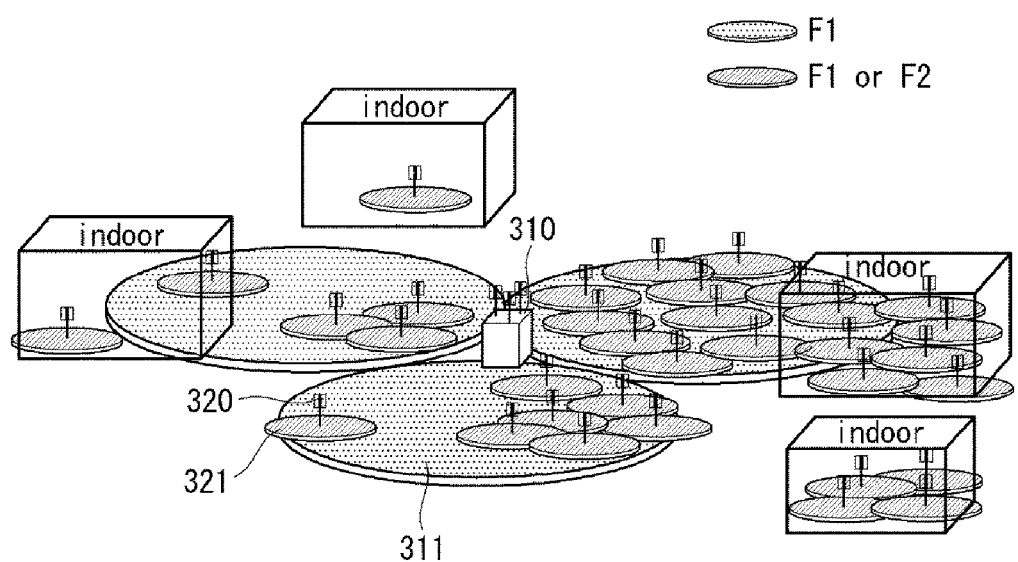

[FIG. 4]
(a) 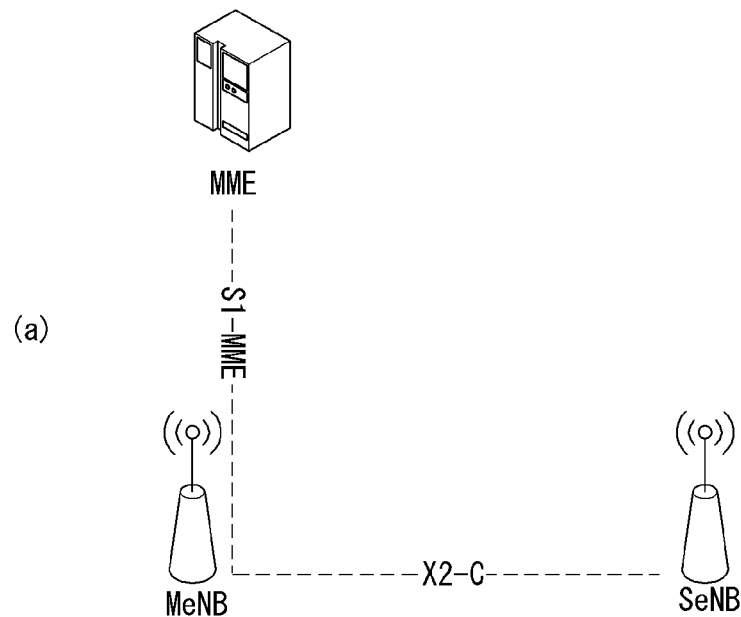
(b) 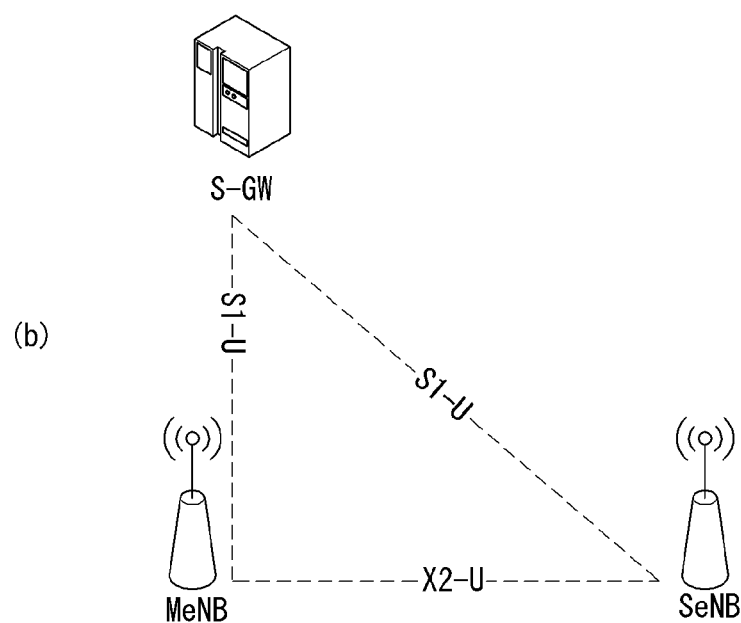

[FIG. 5]
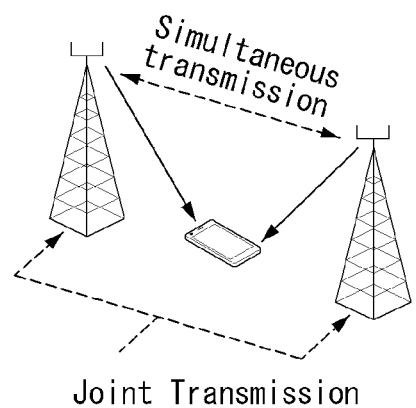
Joint Transmission
(a)
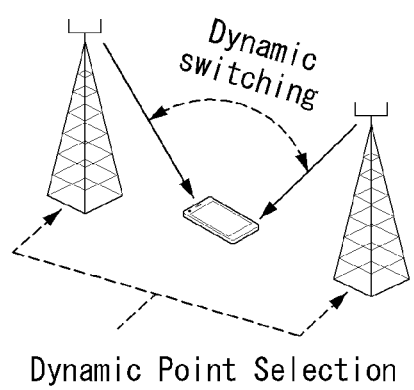
Dynamic Point Selection
(b)
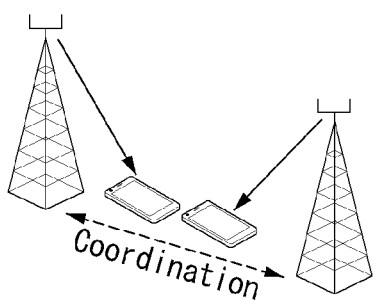
Coordinated Scheduling
(c)
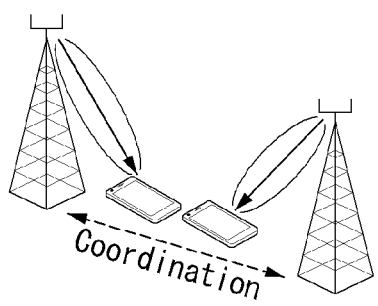
Coordinated Beamforming
(d)

[FIG. 6]
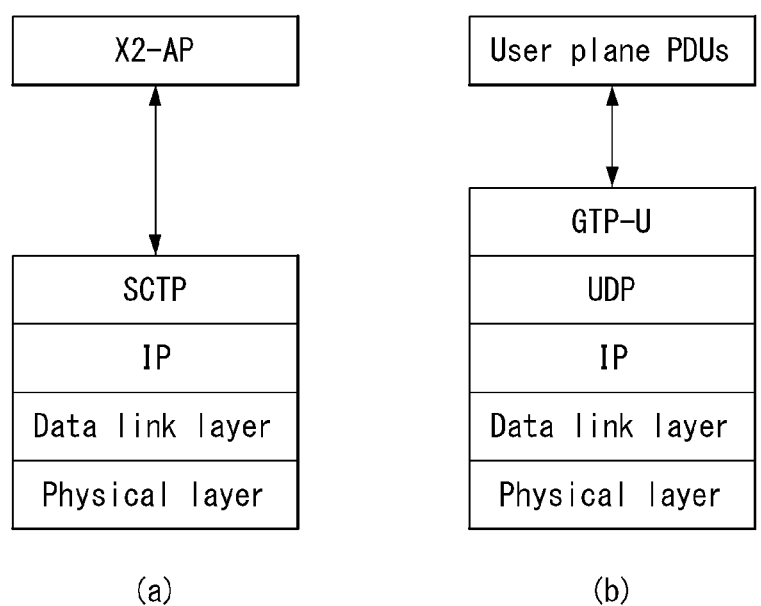

[FIG. 7]
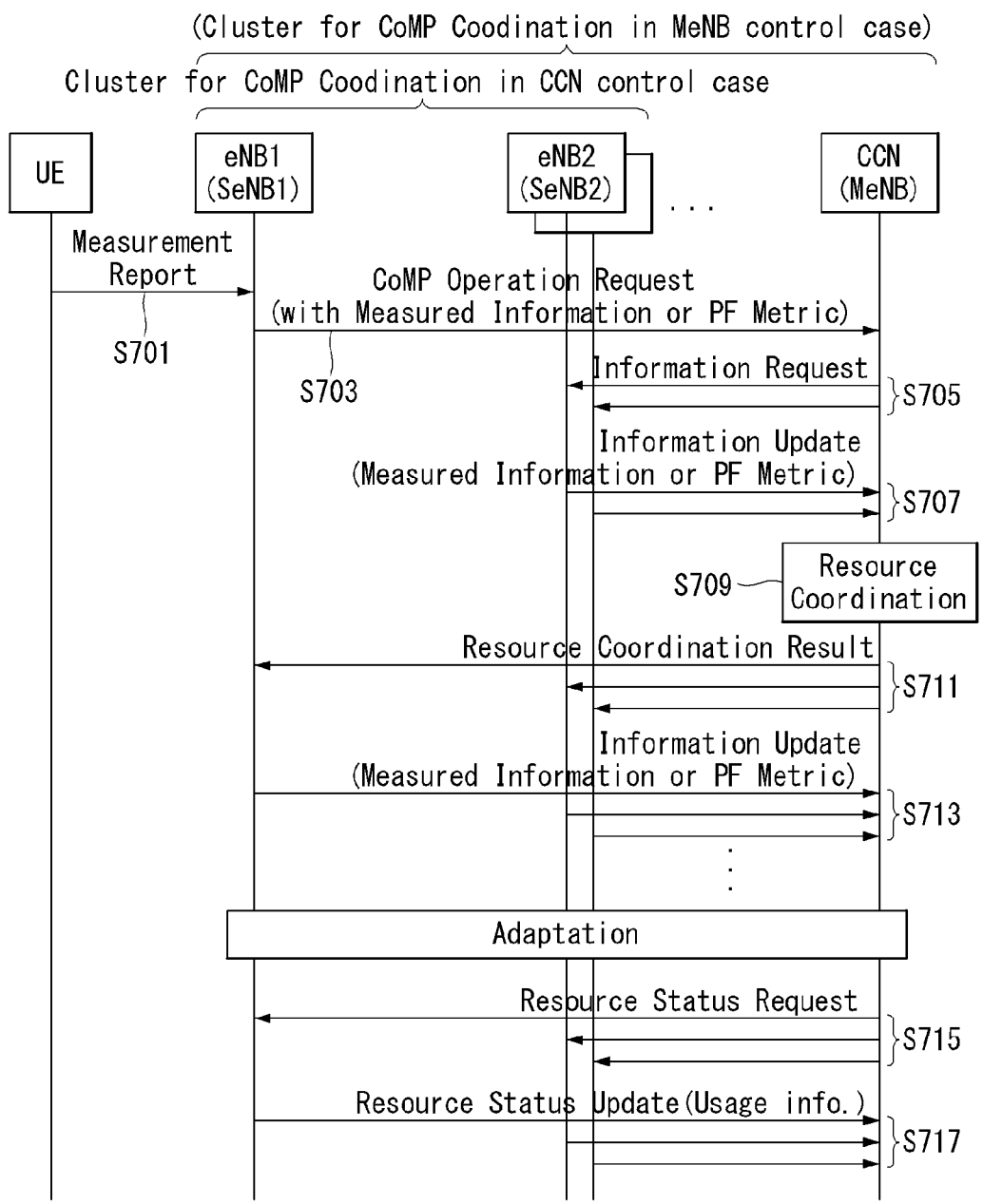

[FIG. 8]
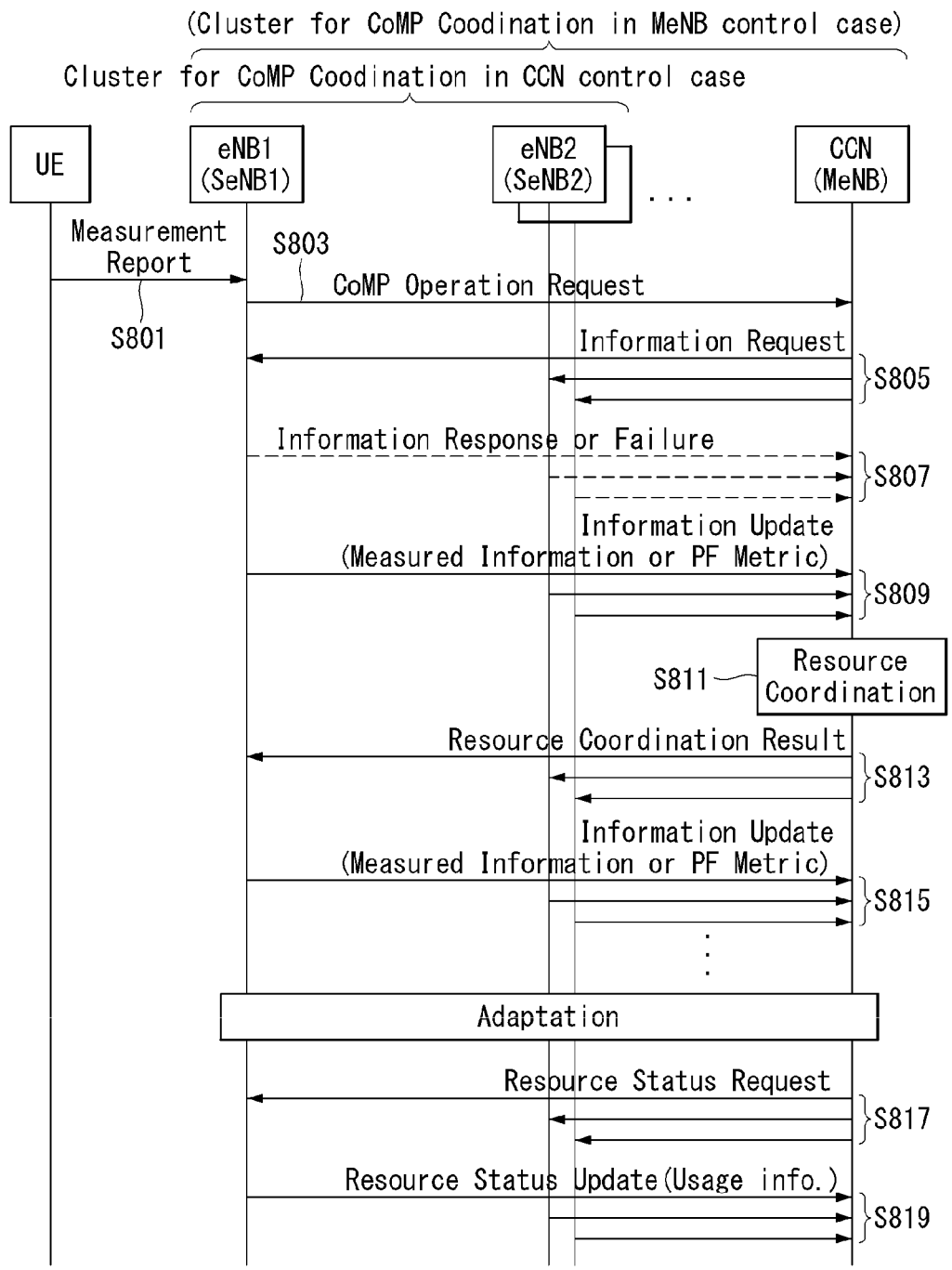

[FIG. 9]
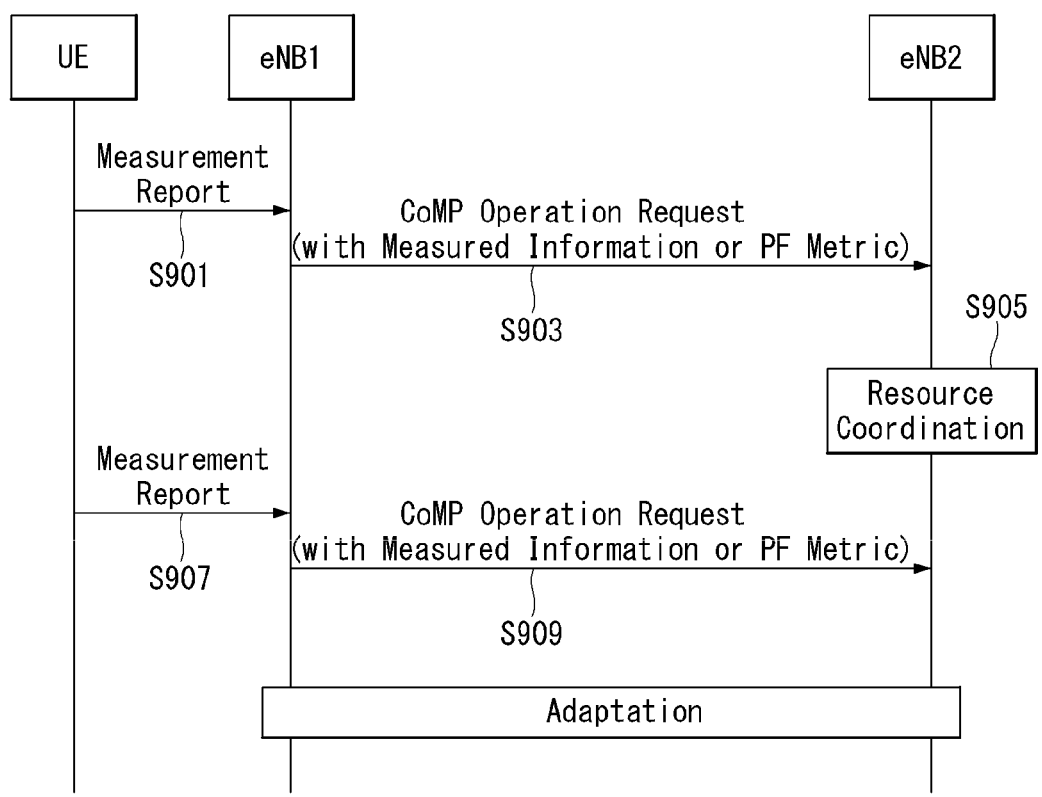

[FIG. 10]
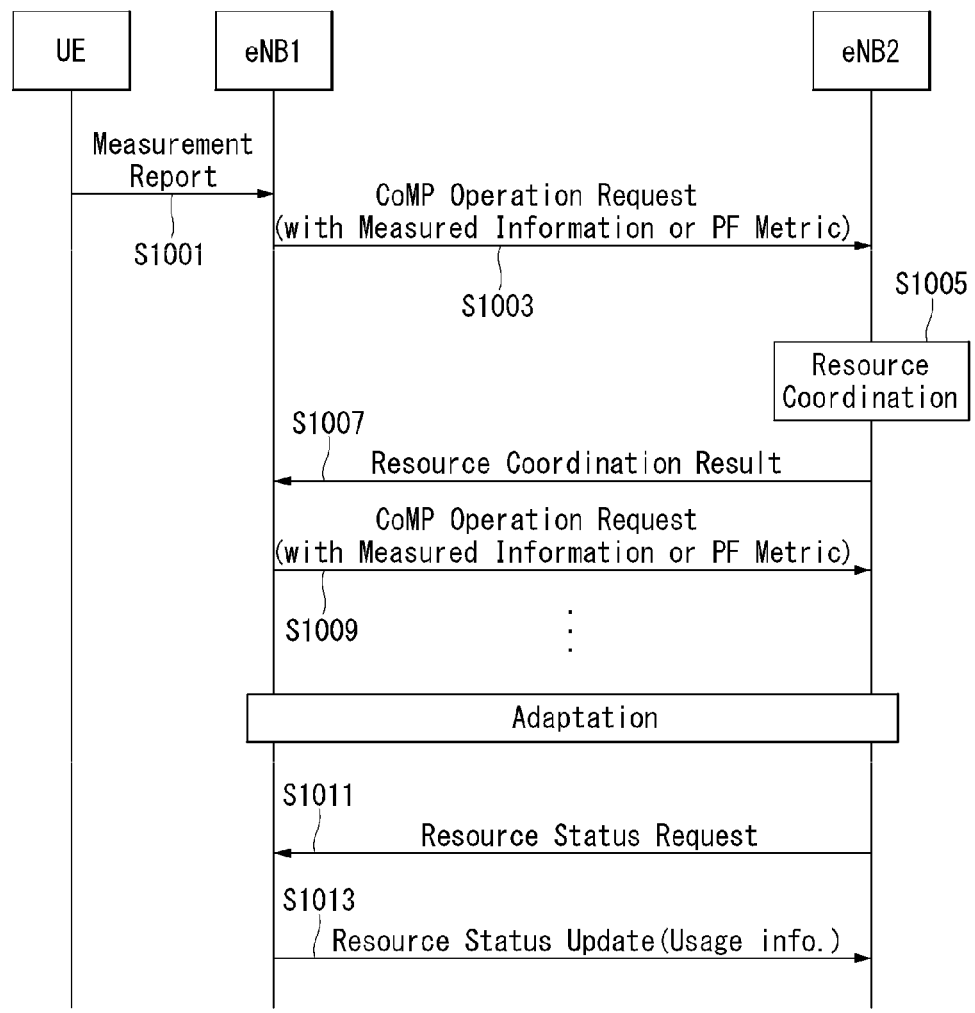

【FIG. 11】
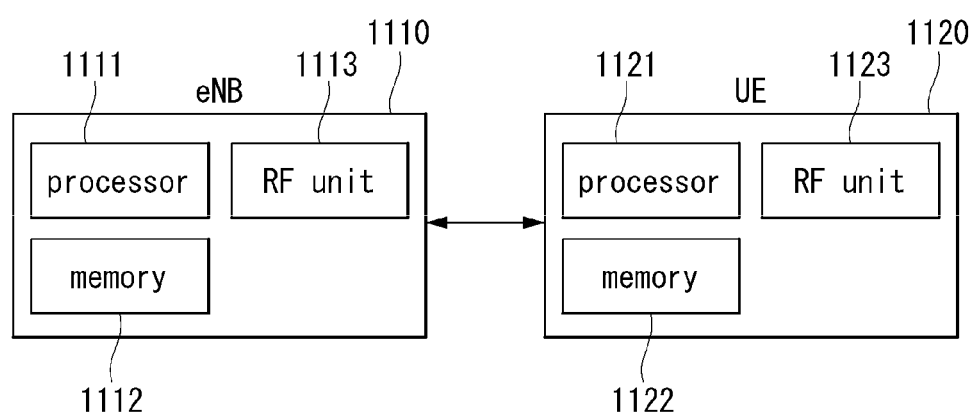

METHOD FOR PERFORMING COMP OPERATION IN WIRELESS COMMUNICATION SYSTEM AND APPARATUS FOR THE SAME

TECHNICAL FIELD

The present invention relates to a wireless communication system and more particularly, a method for performing a Coordinated Multi-Point (CoMP) operation in a wireless communication system and an apparatus supporting the method.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

Requirements of a next-generation mobile communication system may include supporting huge data traffic, a remarkable increase in a transfer rate per user, accommodation of a significantly increased number of connection devices, very low end-to-end latency, high energy efficiency. To this end, various techniques such as small cell enhancement, dual connectivity, massive multiple input multiple output (MIMO), in-band full duplex, non-orthogonal multiple access (NOMA), supporting super-wide band, device networking, and the like, have been studied.

DISCLOSURE

Technical Problem

An object of the present invention is to provide an improved network operation to perform a CoMP operation among cells in a wireless communication system more smoothly.

Another object of the present invention is to provide a signaling procedure among eNBs and parameters exchanged among the eNBs to perform a CoMP operation in a wireless communication system.

The technical problems solved by the present invention are not limited to the above technical problems and those skilled in the art may understand other technical problems from the following description.

Technical Solution

According to one aspect of the present invention, a method for performing an Inter-eNB CoMP (Coordinated Multi-Point) operation in a wireless communication system comprises receiving, by a first eNB, a message requesting initiation of a CoMP operation from a second eNB; transmitting, by the first eNB, to the second eNB a message requesting information about gain expected from a CoMP operation performed in the second eNB; receiving, by the first eNB, the information about gain expected from the second eNB; coordinating, by the first eNB, resources for a CoMP operation based on the information of expected gain; and transmitting, by the first eNB, the resource coordination result to the second eNB.

According to another aspect of the present invention, a first eNB for performing an Inter-eNB CoMP operation in a wireless communication system comprises a Radio Frequency (RF) unit configured to transmit and receive a radio signal and a processor, wherein the processor is configured to receive a message requesting initiation of a CoMP operation from a second eNB, transmit to the second eNB a message requesting information about expected gain when a CoMP operation is carried out in the second eNB, receive the information about expected gain from the second eNB, coordinate resources for a CoMP operation based on the information about expected gain, and transmit the resource coordination result to the second eNB.

Preferably, a transmission period of the information about expected gain or information about a transmission condition can be transmitted together while the second eNB is requested for the information about expected gain.

Preferably, if the information about expected gain is received again, resources for the CoPM operation can be coordinated again.

Preferably, a message for requesting a usage ratio status of resources for the CoMP operation is transmitted to the second eNB, and a usage ratio status of resources for the CoMP operation can be received from the second eNB.

Preferably, whether to stop the CoMP operation can be determined based on a usage ratio status of resources for the CoMP operation.

Preferably, if a usage ratio status of resources for the CoMP operation is reduced below a predetermined threshold, a message requesting stopping of the CoMP operation can be transmitted from the first eNB to the second eNB.

Preferably, the resource coordination result can include at least one of information of frequency/time/power/spatial domain resource allocations, the physical resource block (PRB) muting scheduling result, relative narrowband transmit power (RNTP) scheduling result, almost blank subframes (ABS) pattern scheduling result, PRB power strength scheduling result and coordination for reference signal configurations, Channel State Information (CSI) processes, and CSI-Interference Measurement (IM) configurations of the first and the second eNB supposed to perform the CoMP operation.

Preferably, a message requesting the second eNB for measurement information can be transmitted, and the measurement information can be received from the second eNB.

Preferably, the measurement information can include at least one of Channel Stat Information (CSI), Reference Signal Received Power (RSRP), SRS received power, and User perceived throughput.

Advantageous Effects

According to an embodiment of the present invention, a CoMP operation among cells in a wireless communication system can be carried out more smoothly.

The effects of the present invention are not limited to the above-described effects and other effects which are not described herein will become apparent to those skilled in the art from the following description.

BRIEF DESCRIPTION OF THE DRAWINGS

Mode for Invention

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a schematic structure a network structure of an evolved universal mobile telecommunication system (E-UMTS) to which the present invention can be applied;

FIG. 2 illustrates architecture of a typical E-UTRAN and a typical EPC to which the present invention can be applied;

FIG. 3 is a view schematically illustrating a small cell deployment scenario in the wireless communication system to which the present invention can be applied;

FIG. 4 illustrates network interfaces for Dual Connectivity in the wireless communication system to which the present invention can be applied;

FIG. 5 illustrates CoMP category in the wireless communication system to which the present invention can be applied;

FIG. 6 illustrates the configurations of a control plane and a user plane protocol of an X2 interface in the wireless communication system to which the present invention can be applied;

FIG. 7 illustrates a centralized signaling procedure for inter-eNB CoMP according to one embodiment of the present invention;

FIG. 8 illustrates a centralized signaling procedure for inter-eNB CoMP according to one embodiment of the present invention;

FIG. 9 illustrates a distributed signaling procedure for inter-eNB CoMP according to one embodiment of the present invention;

FIG. 10 illustrates a distributed signaling procedure for inter-eNB CoMP according to one embodiment of the present invention; and FIG. 11 is a block diagram of a wireless communication apparatus according to an embodiment of the present invention.

DESCRIPTION OF EXEMPLARY EMBODIMENTS

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

For clarity, this application focuses on the 3GPP LTE/LTE-A system. However, the technical features of the present invention are not limited thereto.

General System to which the Present Invention May be Applied

FIG. 1 illustrates a schematic structure a network structure of an evolved universal mobile telecommunication system (E-UMTS) to which the present invention can be applied.

An E-UMTS system is an evolved version of the UMTS system. For example, the E-UMTS may be also referred to as an LTE/LTE-A system. The E-UMTS is also referred to as a Long Term Evolution (LTE) system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates architecture of a typical E-UTRAN and a typical EPC to which the present invention can be applied.

Referring to the FIG. 2, the eNB may perform functions of selection for the gateway (for example, MME), routing toward the gateway during a radio resource control (RRC) activation, scheduling and transmitting of paging messages, scheduling and transmitting of broadcast channel (BCH) information, dynamic allocation of resources to the UEs in both uplink and downlink, configuration and provisioning of eNB measurements, radio bearer control, radio admission control (RAC), and connection mobility control in LTE_ACTIVE state. In the EPC, and as stated above, the gateway may perform functions of paging origination, LTE_IDLE state management, ciphering of the user plane, System Architecture Evolution (SAE) bearer control, and ciphering and integrity protection of NAS signaling.

Small Cell Enhancement

In order to accommodate explosively increasing data traffic, research into a small cell enhancement technique to cover a relatively small area using small amount of power, relative to an existing macro cell, has been actively conducted.

Small cell enhancement refers to a technique of densely disposing small cells within macro cell coverage (or without macro cell coverage in case of the interior of a building, or the like) and maximizing spectrum efficiency per unit area through close cooperation between a macro cell eNB and a small cell eNB or between small cell eNBs to enable effective mobility management, while accommodating explosively increasing traffic. In particular, there is huge communication demand in a particular area such as a so-called hot spot within a cell, and receive sensitivity of propagation may be degraded in a particular area such as a cell edge or a coverage hole, and thus, a small cell may be used in a communication shadow area not covered by only a macro cell or an area, such as a hot spot, in which a large amount of data services is requested.

A macro cell eNB may also be called macro eNB (MeNB), and a small cell eNB may also be called small eNB, secondary eNB (SeNB), pico eNB, femto eNB, micro eNB, a remote radio head (RRH), a relay, a repeater, or the like. In this manner, a network in which macro cells and small cells coexist is called a heterogeneous network (HetNet).

FIG. 3 is a view schematically illustrating a small cell deployment scenario in the wireless communication system to which the present invention can be applied.

Referring to FIG. 3, an MeNB 310 provides a wireless communication environment to a UE within coverage of a macro cell area 311, and an SeNB 320 provides a wireless communication environment to a UE within coverage of a small cell area 321.

As illustrated in FIG. 3, coverage of the macro cell area 311 and coverage of the small cell region 321 may overlap or may not, and a carrier frequency F1 supported by the MeNB 310 and a carrier frequency supported by the SeNB 320 may be identical (when the SeNB supports F1) or may not (when the SeNB supports F2). Both ideal backhaul and non-ideal backhaul may be supported between the MeNB and the SeNB or between a plurality of SeNBs. Also, both a dense or sparse small cell deployment may be considered and both indoor and outdoor small cell deployment may be considered. In FIG. 3, the macro cell area 311 and the small cell area 321 are merely illustrative, and different numbers or sizes of the macro cell areas and the small cell areas may be deployed.

Small cell enhancement considers all of various scenarios as described above with respect to the small cell deployment. This will be described in detail hereinafter.

With and without Macro Coverage

Small cell enhancement considers both with and without macro coverage. More specifically, Small cell enhancement is considered the deployment scenario in which small cell nodes are deployed under the coverage of one or more than one overlaid E-UTRAN macro-cell layer(s) in order to boost the capacity of already deployed cellular network. Two scenarios can be considered in the deployment scenario with macro coverage, where the UE is in coverage of both the macro cell and the small cell simultaneously and where the UE is not in coverage of both the macro cell and the small cell simultaneously. Also, Small cell enhancement is considered the deployment scenario where small cell nodes are not deployed under the coverage of one or more overlaid E-UTRAN macro-cell layer(s).

Outdoor and Indoor

Small cell enhancement considers both outdoor and indoor small cell deployments. The small cell nodes could be deployed indoors or outdoors, and in either case could provide service to indoor or outdoor UEs. For indoor UE, only low UE speed (i.e., 0-3 km/h) can be considered. On the contrary, for outdoor, not only low UE speed, but also medium UE speed (i.e., up to 30 km/h and potentially higher speeds) should be considered.

Ideal and Non-Ideal Backhaul

Small cell enhancement considers both ideal backhaul (i.e., very high throughput and very low latency backhaul such as dedicated point-to-point connection using optical fiber) and non-ideal backhaul (i.e., typical backhaul widely used in the market such as xDSL, microwave, and other backhauls like relaying). The performance-cost trade-off should be taken into account.

Sparse and Dense

Small cell enhancement considers sparse and dense small cell deployments. In some scenarios (e.g., hotspot indoor/outdoor places, etc.), single or a few small cell node(s) are sparsely deployed, e.g., to cover the hotspot(s). Meanwhile, in some scenarios (e.g., dense urban, large shopping mall, etc.), a lot of small cell nodes are densely deployed to support huge traffic over a relatively wide area covered by the small cell nodes. The coverage of the small cell layer is generally discontinuous between different hotspot areas. Each hotspot area can be covered by a group of small cells, i.e. a small cell cluster.

Synchronization

Both synchronized and un-synchronized scenarios are considered between small cells as well as between small cells and macro cell(s). For specific operations e.g., interference coordination, carrier aggregation (CA) and inter-eNB COMP, small cell enhancement can benefit from synchronized deployments with respect to small cell search/measurements and interference/resource management.

Spectrum

Small cell enhancement addresses the deployment scenario in which different frequency bands are separately assigned to macro layer and small cell layer, respectively. Small cell enhancement can be applicable to all existing and as well as future cellular bands, with special focus on higher frequency bands, e.g., the 3.5 GHz band, to enjoy the more available spectrum and wider bandwidth. Small cell enhancement can also take into account the possibility for frequency bands that, at least locally, are only used for small cell deployments.

Co-channel deployment scenarios between macro layer and small cell layer should be considered as well. Some example spectrum configurations can be considered as follow.

Carrier aggregation on the macro layer with bands X and Y, and only band X on the small cell layer Small cells supporting carrier aggregation bands that are co-channel with the macro layer Small cells supporting carrier aggregation bands that are not co-channel with the macro layer.

Small cell enhancement should be supported irrespective of duplex schemes (FDD/TDD) for the frequency bands for macro layer and small cell layer. Air interface and solutions for small cell enhancement should be band-independent.

Traffic

In a small cell deployment, it is likely that the traffic is fluctuating greatly since the number of users per small cell node is typically not so large due to small coverage. In a small cell deployment, it is likely that the user distribution is very fluctuating between the small cell nodes. It is also expected that the traffic could be highly asymmetrical, either downlink or uplink centric. Thus, both uniform and non-uniform traffic load distribution in time-domain and spatial-domain are considered.

Dual Connectivity

In the heterogeneous networks which supports small cell enhancement, there are various requirements related to mobility robustness, increased signalling load due to frequent handover and improving per-user throughput and system capacity, etc.

As a solution to realize these requirements, E-UTRAN supports Dual Connectivity (DC) operation whereby a multiple RX/TX UE in RRC_CONNECTED is configured to utilize radio resources provided by two distinct schedulers, located in two eNBs connected via a non-ideal backhaul over the X2 interface. The Dual connectivity may imply Control and Data separation where, for instance, the control signaling for mobility is provided via the macro cell at the same time as high-speed data connectivity is provided via the small cell. Also, a separation between downlink and uplink, the downlink and uplink connectivity is provided via different cells.

eNBs involved in dual connectivity for a certain UE may assume two different roles, i.e. an eNB may either act as an MeNB or as an SeNB. In dual connectivity a UE can be connected to one MeNB and one SeNB. MeNB is the eNB which terminates at least S1-MME in dual connectivity, and SeNB is the eNB that is providing additional radio resources for the UE but is not the Master eNB in dual connectivity.

In addition, DC with CA configured means mode of operation of a UE in RRC_CONNECTED, configured with a Master Cell Group and a Secondary Cell Group. Here, "cell group" is a group of serving cells associated with either the Master eNB (MeNB) or the Secondary eNB (SeNB) in dual connectivity. "Master Cell Group (MCG)" is a group of serving cells associated with the MeNB, comprising of the primary cell (PCell) and optionally one or more secondary cells (SCells) in dual connectivity. "Secondary Cell Group (SCG)" is a group of serving cells associated with the SeNB comprising of primary SCell (pSCell) and optionally one or more SCells.

Here, the "cell" described herein should be distinguished from a 'cell' as a general region covered by a eNB. That is, cell means combination of downlink and optionally uplink resources. The linking between the carrier frequency (i.e. center frequency of the cell) of the downlink resources and the carrier frequency of the uplink resources is indicated in the system information transmitted on the downlink resources.

MCG bearer is radio protocols only located in the MeNB to use MeNB resources only in dual connectivity, and SCG bearer is radio protocols only located in the SeNB to use SeNB resources in dual connectivity. And, Split bearer is radio protocols located in both the MeNB and the SeNB to use both MeNB and SeNB resources in dual connectivity.

FIG. 4 illustrates network interfaces for Dual Connectivity in the wireless communication system to which the present invention can be applied.

FIG. 4(a) illustrates Control Plane architecture for Dual Connectivity, and FIG. 4(b) illustrates User Plane architecture for Dual Connectivity.

Inter-eNB control plane signalling for dual connectivity can be performed by means of X2 interface signalling. Control plane signalling towards the MME is performed by means of S1 interface signalling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB can be performed by means of X2 interface signalling.

Referring to the FIG. 4(a), the MeNB is C-plane connected to the MME via S1-MME, the MeNB and the SeNB are interconnected via X2-C.

FIG. 4(b) shows U-plane connectivity of eNBs involved in dual connectivity for a certain UE. U-plane connectivity depends on the bearer option configured as follow.

For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. Here, split bearer is radio protocols located in both the MeNB and the SeNB to use both MeNB and SeNB resources. For SCG bearers, the SeNB is directly connected with the S-GW via S1-U. Thus, if only MCG and split bearers are configured, there is no S1-U termination in the SeNB.

CoMP (Coordinated Multi-Point)

A Coordinated Multi-Point (CoMP) system (hereinafter referred to as a "CoMP system") is a system for improving the throughput of users in a cell boundary by applying improved Multiple-Input and Multiple-Output (MIMO)

transmission in a multi-cell environment. A CoMP is also called co-MIMO, collaborative MIMO, or network MIMO. If a CoMP system is applied, inter-cell interference in a multi-cell environment can be reduced. If such a CoMP system is used, UE can be commonly supported data from multi-cell eNBs. Furthermore, system performance can be improved because eNBs support one or more UEs at the same time using the same radio frequency resources.

UE that is supported the CoMP may communicate with cells placed at different points. If such cells are bound into a single group, they may operate as a virtual MIMO system. Cells that directly and/or indirectly participate in transmitting sending data to UE are denoted as a CoMP cooperating set. Furthermore, a cell(s) that actually sends data to UE is called a CoMP transmission cell(s) (or Transmission Point (TP).

Such a CoMP technology may be applied to a heterogeneous network (HetNet) in which macro cells and small cells are mixed in addition to a homogeneous network.

Channel State Information for CoMP

In a 3GPP LTE/LTE-A system, each UE reports Channel State Information (CSI) according to a downlink channel condition to an eNB through uplink. The UE measures the state of a channel based on a Cell-specific Reference Signal (CRS) or a Channel State Information-Reference Signal (CSI-RS) received from the eNB. A scheme for reporting channel information is divided into periodic reporting in which channel information is periodically transmitted and aperiodic reporting in which channel information is transmitted in response to a request from an eNB. An eNB determines proper time/frequency resources, a proper Modulation and Coding Scheme (MCS) or beam pattern (or antenna pattern, far-field pattern, radiation pattern) in order to send data for each UE using CSI received from the UE.

Such CSI may basically include a Channel Quality Indicator (CQI), a Precoding Matrix Indicator (PMI), and a Rank Indicator (RI), etc. All pieces of CSI may be transmitted or some of the pieces of CSI may be transmitted depending on transmission mode of each UE.

A CQI is a value indicative of the intensity of a channel, and it commonly means a reception Signal to Interference plus Noise Ratio (SINR) that may be obtained when an eNB uses a PMI. UE reports a CQI index indicative of a specific combination in a set, including combinations of a predetermined modulation scheme and a code rate, to an eNB.

A RI is indicative of information about the rank of a channel, and it means the number of signal streams (or layers) that are received by UE through the same frequency-time resources. The value of a RI commonly has a longer cycle than a PMI, a CQI value because it is dominantly determined due to the long-term fading of a channel. Accordingly, the value of the RI is fed back from UE to an eNB.

A PMI is a value into which the spatial characteristics of a channel have been incorporated, and it indicates the precoding index of an eNB that is preferred by UE based on a metric, such as a Signal to Interference plus Noise Ratio (SINR). That is, a PMI is information about a precoding matrix used for transmission from an eNB. A precoding matrix fed back by UE is determined by taking into consideration the number of layers indicated by an RI. An eNB to which a PMI from UE is fed back may use a precoding matrix, recommended by the UE, without a change. This may be included in data transmission scheduling assignment information about the UE as an indicator of 1 bit. Furthermore, the eNB may not use the precoding matrix indicative of the PMI fed back by the UE without change. In such a case, the eNB may explicitly include information about a precoding matrix, used in data transmission to the UE, in scheduling assignment information.

Cells that belong to a CoMP cooperating set share the Channel State Information (CSI) of UE and determine TP.

For DL CoMP, the UE may be configured to measure and report the CSI of a set of non-zero power CSI-RS resources.

The UE may also be configured with one or more interference measurements. Each interference measurement is associated with one CSI-interference measurement (CSI-IM) resource, which is a set of REs on which the UE measures interference.

The UE may also be configured with multiple CSI processes. Each CSI process defines the CSI measurement associated with one non-zero power CSI-RS resource and one CSI-IM resource.

For UL CoMP, the UE may be configured with UE-specific parameters of PUSCH DMRS sequence and cyclic shift hopping, Physical Uplink Control Channel (PUCCH) sequence, and PUCCH region for hybrid-ARQ feedback. These UE-specific parameters can be configured independently of the physical cell identity of the UE's serving cell.

Intra-eNB/Inter-eNB CoMP

In a multi-cell environment, the CoMP may support both an intra-eNB CoMP and an inter-eNB CoMP. In relation to a cooperation node, the two schemes: the intra-eNB CoMP and the inter-eNB CoMP are present depending on whether or not all cells belonging to a CoMP cooperating set are controlled by the same eNB.

An intra-eNB CoMP operation is supported between cells that share the same eNB as a cell to which UE belongs. A single eNB may manage one or more sites. Furthermore, a site may include one or more cells (or sectors). That is, in the intra-eNB CoMP (including an inter-cell CoMP and an intra-cell CoMP), cooperation is performed only within the cells (or sectors) of the same eNB within a single site. The intra-eNB CoMP includes the CoMP between cells from the same eNB and the CoMP between RRHs distributed by the same cell or the same eNB. Cooperation does not require high speed, low latency, and site-to-site backbone connection, and the size of a CoMP cooperating set does not need to be the same as the number of sectors. As described above, pieces of information (e.g., data and CSI) are exchanged between cells based on the same eNB through ideal backhaul.

For the intra-eNB CoMP with ideal backhaul, two deployment cases may be considered as follows:

A case A: Macro/high power RRH+Macro/high power RRH CoMP scenario

A scenario 1: a homogeneous network with an intra-site CoMP

A scenario 2: a homogeneous network with high Tx power RRHs

The intra-eNB CoMP scenario 1 means a CoMP operation between macro cells in the same site within a single macro eNB. That is, the intra-eNB CoMP scenario 1 means a CoMP operation between neighboring cells within a single site. Furthermore, the intra-eNB CoMP scenario 2 means a CoMP operation between macro cells that belong to different sites within a single macro eNB. That is, the intra-eNB CoMP scenario 2 means a CoMP operation between neighboring cells of cells that belong to different sites.

A case B: Macro+low power RRH CoMP scenario

A scenario 3: a heterogeneous network with low power RRHs within macro cell coverage where transmission/reception points created by RRHs have cell IDs different from the cell ID of a macro cell A scenario 4: a heterogeneous network with low power RRHs within macro cell coverage where transmission/reception points created by the RRHs have the same cell IDs as a macro cell The intra-eNB CoMP scenarios 3 and 4 refer to a CoMP operation between small cells within a corresponding macro cell. In this case, the small cell means a cell that belongs to an RRH connected to a macro eNB to which the macro cell belongs through ideal backhaul.

Furthermore, the inter-eNB CoMP operation is supported between cells belonging to eNBs different from a cell to which UE belongs. That is, in the inter-eNB CoMP, cooperation is performed only within the cells (or sectors) of difference sites. This results in an interference problem at a cell boundary. Cooperation requires high speed, low latency, and site-to-site backbone connection. The static or dynamic clustering of a CoMP cooperating set is possible. As described above, pieces of information may be exchanged between cells based on different eNBs through non-ideal backhaul, such as microwaves, a Digital Subscriber Line (DSL), a cable, or a Passive Optical Network (PON).

For the inter-eNB CoMP with non-ideal backhaul, two deployment cases may be considered as follows:

A case A: a CoMP operation scenario between macro eNBs in a homogeneous network

A case B: a CoMP operation scenario in the Small Cell Enhancement (SCE)

A scenario 1: a CoMP operation between a macro eNB and a small cell eNB in a heterogeneous network A scenario 2a: a CoMP operation between small cell eNBs in a heterogeneous network The inter-eNB CoMP scenario 1 means a CoMP operation between a macro cell and a small cell within the corresponding macro cell. In this case, the small cell means a cell belonging to an SeNB that is connected to a macro eNB to which the macro cell belongs through non-ideal backhaul. Furthermore, the inter-eNB CoMP scenario 2a means a CoMP operation between small cells within a macro cell. In this case, the channel of the macro cell is different from the channels of the small cells, and the channels of the small cells may be the same.

A single cell MIMO user within a single cell may communicate with a single SeNB in a single cell (or sector). A multi-cell MIMO user placed at a cell boundary may communicate with a plurality of SeNBs in a multi-cell (or sector). Furthermore, the type of cooperated users may be divided into Single User MIMO (SU-MIMO) and Multi-User MIMO (MU-MIMO). The CoMP may provide service to a single user in SU-MIMO mode and may serve various cases of UE at the same time in MU-MIMO mode.

CoMP Category

In relation to a cooperation level, a CoMP scheme may be divided into a variety of types of schemes depending on the degree of coordination, a traffic load, etc. between cells. This is described later with reference to FIG. 5.

FIG. 5 illustrates a CoMP category in a wireless communication system to which the present invention may be applied.

A CoMP scheme that may be applied to downlink may be divided into a Joint Processing (JP) scheme and a Coordinated Scheduling/Beamforming (CS/CB) scheme.

In the JP scheme, data for UE may be used in one or more points (eNBs) of a CoMP cooperating set. The JP scheme may be divided into a Joint Transmission (JT) scheme and a Dynamic Point Selection (DPS) scheme.

The JT scheme means a scheme in which some or all of a plurality of points that belongs to a CoMP cooperating set sends the same data through the same time-frequency resources at the same time. That is, data transmitted by a single UE or a plurality of pieces of UE through the same time-frequency resources may be transmitted by a plurality of transmission points at the same time. Accordingly, the quality of a signal transmitted by a UE can be increased regardless of a coherent or non-coherent way and interference between UEs can be actively removed through such a cooperation transmission scheme.

The DPS or muting scheme means a scheme in which data may be used in multiple points at the same time, but data is transmitted by a single point within a CoMP cooperating set through a single time-frequency resource. Data transmitted to UE through a specific time-frequency resource is transmitted by a single point, but is muted in another point within a CoMP cooperating set.

A point at which data is transmitted to UE or the data is muted may be dynamically selected for each subframe, and a Resource Block (RB) pair within a single subframe may be changed. The DPS scheme includes Dynamic Cell Selection (DCS).

As in a case where a plurality of points is selected through data transmission through the same time-frequency resources, the DPS scheme, together with the JT scheme, may form a set.

In the Coordinated Scheduling/Beamforming (CS/CB) scheme, data for UE may be used only in a single point within a CoMP cooperating set, and data is transmitted only by the corresponding point through a single time-frequency resource. That is, the data is transmitted from only the single point to the UE, but user scheduling/beamforming may be determined through cooperation between a plurality of points within the CoMP cooperating set. A Transmission Point (TP) may be semi-statically selected. Semi-Static Point Selection (SSPS) means transmission from one point to specific UE at a time. In this case, a transmission point may only change in a semi-static manner.

The CS/CB scheme may be divided into a Coordinated Scheduling (CS) scheme and a Coordinated Beamforming (CB) scheme.

In the CS scheme, a plurality of points within a CoMP cooperating set cooperates with each other and allocates different frequency resources to different UEs. Furthermore, in the CB scheme, a plurality of points within a CoMP cooperating set cooperates with each other and allocates different beam patterns to different UEs. As described above, different UEs receive data from respective serving cells only.

A CoMP operation of a hybrid category in which the JP scheme and the CS/CB scheme are combined is possible. Data for UE may be available only in a subset of points in a CoMP cooperating set for time-frequency resources, but user scheduling/beamforming are determined through coordination between points corresponding to the CoMP cooperating set. For example, some points within the CoMP cooperating set may send data to target UE according to the JP scheme, whereas other points within the CoMP cooperating set may perform CS/CB.

In the case of uplink, CoMP reception means that signals transmitted through cooperation between a plurality of points that are geographically separated are received. A CoMP scheme that may be applied to uplink may be divided into a Joint Reception (JR) scheme and a Coordinated Scheduling/Beamforming (CS/CB) scheme.

The JR scheme means a scheme in which some or all of a plurality of points receive a signal transmitted through a PUSCH in a CoMP unit. In the CS/CB scheme, a single point receives a signal transmitted through a PUSCH, but user scheduling/beamforming may be determined through cooperation between a plurality of cells in a CoMP unit.

CoMP Sets

CoMP cooperating set is the set of (geographically separated) points directly and/or indirectly participating in data transmission to a UE in a time-frequency resource. This set may or may not be transparent to the UE. The CoMP cooperating set defines the coordination area.

Direct participation is point(s) actually transmitting data in the time-frequency resource, and Indirect participation is candidate point(s) for data transmission that do not transmit data but contribute in making decisions on the user scheduling/beamforming in the time-frequency resource.

CoMP transmission point(s) is point or set of points transmitting data to a UE.

CoMP transmission point(s) is (are) a subset of the CoMP cooperating set.

For JT, CoMP transmission points may include multiple points in the CoMP cooperating set at each subframe for a certain frequency resource.

For CS/CB, DPS, SSPS, a single point in the CoMP cooperating set is the CoMP transmission point at each subframe for a certain frequency resource.

For SSPS, this CoMP transmission point can change semi-statically within the CoMP cooperating set.

CoMP measurement set is the set of points about which channel state/statistical information related to their link to the UE is measured and/or reported.

Radio Resource Management (RRM) measurement set is the set of cells for which the RRM measurements are performed (already in Rel-8). Additional RRM measurement methods can be considered e.g. in order to separate different points belonging to the same logical cell entity or in order to select the CoMP measurement set.

Meanwhile, the management of the CoMP measurement set may be based on UL sounding reference signal (SRS)/demodulation reference signal (DMRS)/PUCCH transmission and/or DL RRM measurements (e.g., reference signal received power (RSRP)/reference signal received quality (RSRQ) information). Measurement based on CRS and/or CSI-RS may be considered.

The CoMP cooperating set and the transmission points would be determined in the higher layers based on the CSI measurement of points included in the CoMP measurement set. Depending on the level of coordination, the cooperating set could be determined at the RRC level or at the MAC scheduler level.

X2 Interface

FIG. 6 illustrates the configurations of a control plane and a user plane protocol of an X2 interface in the wireless communication system to which the present invention can be applied.

FIG. 6(a) shows the control plane protocol stack on the X2 interface, and FIG. 6(b) shows the user plane protocol stack on the X2 interface.

Referring to the FIG. 6(a), the X2 control plane interface (X2-CP) is defined between two neighbor eNBs. The transport network layer is built on SCTP (Stream Control Transmission Protocol) on top of IP (Internet Protocol). The application layer signaling protocol is referred to as X2-AP (X2 Application Protocol).

A single SCTP association per X2-C interface instance shall be used with one pair of stream identifiers for X2-C common procedures. Only a few pairs of stream identifiers should be used for X2-C dedicated procedures.

Source-eNB communication context identifiers that are assigned by the source-eNB for X2-C dedicated procedures, and target-eNB communication context identifiers that are assigned by the target-eNB for X2-C dedicated procedures, shall be used to distinguish UE specific X2-C signalling transport bearers. The communication context identifiers are conveyed in the respective X2AP messages.

RNs terminate X2-AP. In this case, there is one X2 interface relation between the RN and the DeNB.

The X2AP protocol supports the following functions:

Intra LTE-Access-System Mobility Support for UE in ECM-CONNECTED (Context transfer from source eNB to target eNB, Control of user plane tunnels between source eNB and target eNB, Handover cancellation)

Support of Dual Connectivity for UE in ECM-CONNECTED (Establishment, Modification and Release of a UE context at the SeNB, Control of user plane tunnels between MeNB and SeNB for a specific UE for split bearer and data forwarding, Provision of the transport network layer (TNL) information of the S1 user plane tunnels for SCG bearers)

Load Management

General X2 management and error handling functions (Error indication, Setting up the X2, Resetting the X2, Updating the X2 configuration data)

Mobility failure event notification and information exchange in support of handover settings negotiation Energy Saving. This function allows decreasing energy consumption by enabling indication of cell activation/deactivation Referring to the FIG. 6(b), the X2 user plane interface (X2-U) is defined between eNBs. The LTE X2-U protocol tunnels end-user packets between eNBs. The tunneling function supports the identification of packets with the tunnels and packet loss management. The X2-U interface provides non guaranteed delivery of user plane packet data units (PDUs). The transport network layer is built on IP transport and GTP-U is used on top of UDP (user datagram protocol) or IP to carry the user plane PDUs. The X2-UP interface protocol stack is identical to the S1-UP protocol stack. Thus, protocol processing for the eNB at the time of data forwarding can be minimized.

CoMP Procedures

The present invention proposes a signaling procedure for centralized/distributed CoMP architecture, information exchanged between eNBs, and parameters.

The centralized CoMP architecture is applied when more than 2 eNBs are grouped together. In what follows, centralized CoMP architecture will be described.

The centralized architecture assumes two options: one option is that the central coordination node (CCN) manages eNBs' resources to apply the CoMP operations, and the other is that macro eNB coordinates resources of SeNBs located in its coverage area. To implement the CoMP mechanism, the common procedure depicted in FIGS. 7 and 8 could be considered for two options.

First, in case an MeNB controls resource coordination for CoMP operation as shown in FIGS. 7 and 8, it is assumed that eNB 1, eNB 2, . . . , eNB n (CCN of FIGS. 7 and 8) forms a cluster for CoMP coordination; and eNB 1, eNB 2, . . . , eNB n−1 are SeNBs and eNB n is an MeNB. It is further assumed that eNB n, the MeNB, is the node which determines the CoMP operation.

Meanwhile, in case a CCN controls resource coordination for CoMP operation as shown in FIGS. 7 and 8, it is assumed that eNB 1, eNB 2, . . . , eNB n−1 forms a cluster for CoMP coordination. And it is further assumed that the CCN, different from eNB 1, eNB 2, . . . , eNB n−1 comprising a CoMP cluster, is the node which determines the CoMP operation.

However, it should be noted that the present invention is not limited to the above assumption; in case all of the eNB 1, eNB 2, . . . eNB n comprising a CoMP cluster are MeNBs or SeNBs, the eNB 1, eNB 2, . . . , eNB n (CCN of FIGS. 7 and 8) forms a cluster for CoMP coordination; and one of the eNBs from among the eNB 1, eNB 2, . . . , eNB n, becomes the node which determines the CoMP operation.

FIG. 7 illustrates a centralized signaling procedure for inter-eNB CoMP according to one embodiment of the present invention.

With reference to FIG. 7, a UE transmits a MEASUREMENT REPORT to the eNB 1 (or SeNB 1) to which the UE belongs (S701).

As detailed above, the UE can measure channel state/statistical information with respect to a cell included in a CoMP measurement set and report the measurement to a serving eNB (namely, eNB 1 or SeNB 1).

The eNB 1 (or SeNB 1) transmits a CoMP operation request message to request a central node (CCN or MeNB) to perform a CoMP operation (S703).

A message meant for requesting initiation of a CoMP operation can be transmitted periodically or aperiodically or according to the occurrence of events. In this case, a LOAD INFORMATION message, which is an X2AP protocol message, can be used as a message to request initiation of a CoMP operation.

Based on the MEASUREMENT REPORT received from a UE, the eNB 1 (or SeNB 1) determines whether to request a CoMP operation. In other words, based on CSI measurement of points included in a CoMP measurement set, the eNB 1 can determine whether to request a CoMP operation. If an eNB feels severe DL interferences from neighbor cells, it may invoke its central node (CCN or MeNB) to start the CoMP operation.

When requesting the CoMP operation, the eNB (i.e., eNB 1 (or SeNB 1)) can include the measured information (e.g., CSI, RSRP, SRS received power, User perceived throughput, etc.) and/or the PF metric of individual UE in the message. In the case of FIG. 7, it is assumed that the measurement information and/or PF metric are transmitted along with a request for a CoMP operation.

At this time, PF metric quantifies the profit (or benefit, gain) that a cell of the sender node expects in its scheduling when the associated CoMP resource coordination is assumed. In other words, the PF metric can be transmitted periodically or aperiodically through a request message. Also, the PF metric can represent profit (or benefit, gain) information in units of PRBs. The RSRP informs about how much interference a UE belonging to the corresponding cell receives from neighboring cells or eNBs.

If one (namely, eNB 1 or SeNB 1) of the eNBs belonging to a CoMP cluster (namely, eNB 1 (or SeNB 1), . . . , eNB n−1 (or SeNB n−1)) receives a request for initiation of the CoMP procedure, a central node (CCN or MeNB) transmits an Information Request message for requesting measurement information and/or PF metric from a eNB belonging to the CoMP cluster (S705).

That is, after receiving the CoMP Operation Request, the central node requests eNBs (or SeNBs) belonging to the CoMP cooperation cluster to send the measured information (e.g. CSI, RSRP, SRS received power, User perceived throughput, etc.) and/or the PF metrics for resource coordination.

At this time, a LOAD INFORMATION message, which is an X2AP message, can be used as a message for requesting a measurement information and/or PF metric from a eNB belonging to the CoMP cluster.

In the S703 step, since the eNB 1 (or SeNB 1) transmits the measured information and/or PF metric by incorporating the measure information and/or PF metric into a CoMP Operation Request message while requesting a CoMP operation, the central node (CCN or MeNB) does not request the eNB 1 (or SeNB 1) to transmit the measured information and/or PF metric to itself. In other words, an Information Request message meant for requesting the measured information and/or PF metric can be transmitted only to other eNBs (eNB 2 (or SeNB 2), . . . , eNB n−1 (or SeNB n−1)) excluding the eNB 1 (or SeNB 1).

The Information Request message can include information describing a transmission condition for the measured information and/or PF metric and information about a transmission period of the measured information and/or PF metric.

More specifically, if information about a transmission condition for the measured information and/or the PF metric are transmitted being included in the Information Request message, eNBs (or SeNBs) within a CoMP cluster can transmit the measured information and/or PF metric to the central node (CCN or MeNB) through an Information Update message each time the corresponding transmission condition is met. For example, the transmission condition may include a case where interference from a neighboring cell exceeds a predetermined threshold, a case where the interference is reduced below a predetermined threshold, or a case where throughput of the corresponding UE exceeds or is reduced below a predetermined threshold.

Also, if information about a transmission period of the measured information and/or PF metric is transmitted being included in the Information Request message, the eNBs (or SeNBs) within a CoMP cluster can transmit the measured information and/or PF metric to the central node (CCN or MeNB) through the Information Update message at the corresponding intervals.

Meanwhile, the embodiment above describes an example where a central node (CCN or MeNB) transmits an Information Request message as a response to a CoMP Operation Request message, but the present invention is not limited to the embodiment above. That is, the Information Request message also can be sent to eNBs (or SeNBs) in CoMP cluster without any CoMP Operation Request from eNBs (or SeNBs). Therefore, the central node (CCN or MeNB) can start a procedure for a CoMP operation even if no eNBs (or SeNBs) within a CoMP cluster request the CoMP operation. In this case, the S701 and S703 steps of FIG. 7 can be omitted.

And, the Information Request message also can be sent to eNBs when eNB status reflected in the 'Information Update' received from eNB requires the CoMP operation.

Each of the eNB 2 (or SeNB 2), . . . , eNB n−1 (or SeNB n−1) receiving an Information Request message from the central node (CCN or MeNB) transmits an Information Update message to the central node (CCN or MeNB) (S707).

In other words, each of the eNB 2 (or SeNB 2), . . . , eNB n−1 (or SeNB n−1) transmits the measured information and/or PF metric to the central node (CCN or MeNB) through the Information Update message.

At this time, the LOAD INFORMATION message, which is an X2AP protocol message, can be used as a message for transmitting the measured information and/or PF metric.

The Information Update message can be transmitted periodically or aperiodically. For example, if a transmission period of the measurement information and/or PF metric is transmitted through the Information Request message, the eNBs (or SeNBs) within a cluster can transmit the measurement information and/or PF metric to the central node (CCN or MeNB) through the Information Update message in accordance to the respective transmission periods. Also, the measurement information and/or PF metric can be transmitted aperiodically according to the request of the central node (CCN or MeNB).

If the measured information and/or PF metric is received from each of the eNBs (or SeNBs) within the CoMP cluster, the central node (CCN or MeNB) coordinates cell resources belonging to the eNBs (or SeNBs) of the CoMP cluster (S709).

The central node (CCN or MeNB) coordinates resources among cells belonging to the eNBs (or SeNBs) within the CoMP cluster based on the measured information and/or PF metric received from the eNBs (or SeNBs) included in the CoMP cluster. The central node (CCN or MeNB) can determine which time-frequency resource or which beam pattern to use when a eNB belonging to the CoMP cluster performs a CoMP operation for the corresponding UE. In other words, the central node can determine how resources are allocated to individual cells while avoiding overlapping of resources used by the respective cells. More specifically, the central node (CCN or MeNB) may coordinate resources to be allocated in every cell that belongs to the CoMP cluster in frequency/time/power/spatial domain. Also, the central node (CCN or MeNB) may determine PRB muting scheduling, relative narrowband transmit power (RNTP) scheduling, almost blank sub-frames (ABS) pattern scheduling (in power and spatial domain) and PRB power strength scheduling that will be executed in every cell that belongs to the CoMP cluster. Also, the central node (CCN or MeNB) may determine coordination for reference signal configurations, CSI processes and CSI-Interference Measurement (IM) configurations that will be executed in every cell that belongs to the CoMP cluster.

Also, the central node (CCN or MeNB) can determine a CoMP transmission point made of one or more eNBs meant for transmitting data to the corresponding UEs from among eNBs belonging to the CoMP cluster and coordinate resources of the determined CoMP transmission point. In other words, the central node may determine which time-frequency resource or which beam pattern to use for each CoMP transmission point determined.

The central node (CCN or MeNB) which has coordinated resources of the respective cells supposed to perform the CoMP operation transmits a Resource Coordination Result message to inform the respective eNBs of the CoMP cluster about the resource coordination result (S711).

The resource coordination result may include the information of frequency/time/power/spatial domain resource allocations that will be executed in every cell belong to CoMP cluster. The resource coordination result may include the PRB muting scheduling result, RNTP scheduling result, ABS pattern scheduling result (in power and spatial domain), and PRB power strength scheduling result that will be executed in every cell that belongs to the CoMP cluster. Also, the resource coordination result may include coordination result for reference signal configurations, CSI processes and CSI-Interference Measurement (IM) configurations that will be executed in every cell that belongs to the CoMP cluster. In other words, the resource coordination result can include at least one or more of the information listed above.

The resource coordination result can be transmitted periodically or aperiodically. In the case of periodic transmission, the Resource Coordination Result message includes period information meant for informing about the period at which the resource coordination result is transmitted. In the case of aperiodic transmission, the Resource Coordination Result message includes valid time information of the resource coordination result. The resource coordination result can indicate resource coordination information for each PRB within one or more subframes for each cell.

Also, the Resource Coordination Result message can include information about a transmission condition with respect to the measured information and/or PF metric and information about a transmission period of the measured information. In this case, as described above, the eNBs (or EsNBs) within the CoMP cluster can transmit the measured information and/or PF metric to the central node (CCN or MeNB) through the Information Update message each time the corresponding condition is met or according to the transmission period.

The resource coordination result may comprise a hypothetical resource allocation associated with a cell ID, where the cell identified by the cell ID is not necessarily controlled by the receiving eNB.

The resource coordination result which is transmitted to a certain eNB may include the results of resource coordination for all the eNBs (including the certain eNB) that perform the CoMP operation. That is, the resource coordination result may include the results of resource coordination for another eNBs as well as the certain eNB that will perform a CoMP operation through cooperation in addition to information about time-frequency resources or a beam pattern.

Afterwards, resources of the respective eNBs (or SeNBs) within the cluster meant for the CoMP operation are coordinated; each of the eNBs (or SeNBs) within the cluster reports the measured information and/or PF metric periodically or aperiodically to the central node (CCN or MeNB) while the CoMP operation is performed and thus resources employed for the CoMP operation can be re-allocated.

Each of the eNB 1 (or SeNB 1), . . . , eNB n−1 (or SeNB n−1) belonging to the cluster transmits the Information Update message to the central node (CCN or MeNB) (S713).

In other words, each of the eNB 1 (or SeNB 1), . . . , eNB n−1 (or SeNB n−1) transmits the measured information and/or PF metric to the central node (CCN or MeNB) through the Information Update message.

At this time, the LOAD INFORMATION message, which is an X2AP protocol message, can be used as a message to transmit the measured information and/or PF metric.

As described above, the Information Update message can be transmitted periodically or aperiodically. For example, if a transmission period of the measured information and/or PF metric is transmitted through the Information Request message, the eNBs (or SeNBs) belonging to the cluster can transmit the measured information and/or PF metric to the central node (CCN or MeNB) through the Information Update message according to the respective transmission periods. Also, the measured information and/or PF metric can be transmitted aperiodically when there is a request from the central node (CCN or MeNB) or when a particular condition is met.

The central node (CCN or MeNB) can optimize the resources meant for the CoMP operation by adaptively re-allocating the resources used for the CoMP operation based on the measured information and/or PF metric included in the Information Update message transmitted periodically or aperiodically.

Afterwards, the central node (CCN or MeNB), receiving a usage ratio status of resources employed for the CoMP operation from the eNBs (or SeNBs) belonging to the cluster, can determine whether to stop the CoMP operation.

With reference to FIG. 7, the central node (CCN or MeNB) transmits a Resource Status Request message to the eNBs (or SeNBs) belonging to the cluster to request a usage ratio status of resources allocated for the CoMP operation (S715).

The eNBs (or SeNBs) belonging to the cluster which have received the Resource Status Request message transmit a Resource Status Update message to the central node (CCN or MeNB) to report the usage ratio status of the resources designated by CoMP coordination (S717).

The Resource Status Update message can be transmitted periodically or aperiodically. In case the Resource Status Update message is transmitted periodically, transmission period information of the Resource Status Update message can be transmitted being included in the Resource Status Request message. On the other hand, in the case of aperiodic transmission of the Resource Status Update message, the Resource Status Update message can be transmitted in response to the Resource Status Request message.

The central node (CCN or MeNB) can determine whether to stop the CoMP operation by receiving the usage ratio status of the resources allocated for the CoMP operation of the eNBs (or SeNBs) belonging to the CoMP cluster. For example, if the usage ratio status of the resources designated for the CoMP operation in the eNBs (or SeNBs) belonging to the cluster is reduced below a predetermined threshold, the central node (CCN or MeNB) can transmit a message for requesting suspension of the CoMP operation. At this time, the LOAD INFORMATION message can be used as a message for requesting suspension of the CoMP operation.

On the other hand, if a message for requesting suspension of the CoMP operation is received due to the usage ratio status of resources from any one (namely, eNB 1 (or SeNB 1), . . . , eNB n-1 (or SeNB n-1)) of the eNBs (or SeNBs) comprising the CoMP cluster, the central node (CCN or MeNB) delivers the corresponding message to other eNBs (or SeNBs) constituting the CoMP cluster, thereby stopping the CoMP operation.

FIG. 8 illustrates a centralized signaling procedure for inter-eNB CoMP according to one embodiment of the present invention.

With reference to FIG. 8, a UE transmits a MEASUREMENT REPORT to the eNB 1 (or SeNB 1) to which the UE belongs (S801).

As described above, the UE measures channel state/ statistical information with respect to a cell included in a CoMP measurement set and reports the measurement result to a serving eNB (namely, eNB 1 or SeNB 1).

The eNB 1 (or SeNB 1) transmits a CoMP Operation Request message to request the central node (CCN or MeNB) to perform a CoMP operation (S803).

A message meant for requesting initiation of a CoMP operation can be transmitted periodically or aperiodically or according to the occurrence of events. In this case, a LOAD INFORMATION message, which is an X2AP protocol message, can be used as a message to request initiation of a CoMP operation.

Based on the MEASUREMENT REPORT message received from a UE, the eNB 1 (or SeNB 1) determines whether to request a CoMP operation. In other words, based on CSI measurement of points included in a CoMP measurement set, the eNB 1 can determine whether to request a CoMP operation. If an eNB feels severe DL interferences from neighbor cells, it may invoke its central node (CCN or MeNB) to start the CoMP operation.

When requesting the CoMP operation, the eNB can include the measured information (e.g. CSI, RSRP, SRS received power, User perceived throughput, etc.) and/or the PF metric of individual UE in the message. In the case of FIG. 8, however, it is assumed that only the message for requesting a CoMP operation is transmitted, but the measured information and/or PF metric is not transmitted.

If one (namely, eNB 1 or SeNB 1) of the eNBs belonging to a CoMP cluster (namely, eNB 1 (or SeNB 1), . . . , eNB n-1 (or SeNB n-1)) receives a request for initiation of the CoMP procedure, a central node (CCN or MeNB) transmits an Information Request message for requesting measurement information and/or PF metric from a eNB belonging to the CoMP cluster (S805).

That is, after receiving the CoMP Operation Request, the central node requests eNBs (or SeNBs) belonging to the CoMP cooperation cluster to send the measured information (e.g. CSI, RSRP, SRS received power, User perceived throughput, etc.) and/or the PF metrics for resource coordination.

At this time, the LOAD INFORMATION message, which is an X2AP protocol message, can be used as a message for requesting the measured information and/or PF metric.

In the S803 step, since the eNB 1 (or SeNB 1) does not transmit the measured information and/or PF metric while requesting the CoMP operation, the central node (CCN or MeNB) requests the eNBs (or SeNBs) within the cluster including the eNB 1 (or SeNB 1) to transmit the measured information and/or PF metric to itself.

The Information Request message can include information describing a transmission condition for the measured information and/or PF metric and information about a transmission period of the measured information.

More specifically, if the measured information and/or information about a transmission condition for the PF metric are transmitted being included in the Information Request message, eNBs (or SeNBs) within a CoMP cluster can transmit the measured information and/or PF metric to the central node (CCN or MeNB) through an Information Update message each time the corresponding transmission condition is met. For example, the transmission condition may include a case where interference from a neighboring cell exceeds a predetermined threshold, a case where the interference is reduced below a predetermined threshold, or a case where throughput of the corresponding UE exceeds or is reduced below a predetermined threshold.

Also, if information about a transmission period of the measured information and/or PF metric is transmitted being included in the Information Request message, the eNBs (or SeNBs) within a CoMP cluster can transmit the measured information and/or PF metric to the central node (CCN or MeNB) through the Information Update message at the corresponding intervals.

Meanwhile, the embodiment above describes an example where a central node (CCN or MeNB) transmits an Information Request message as a response to a CoMP Operation Request message, but the present invention is not limited to the embodiment above. That is, the Information Request message also can be sent to eNBs (or SeNBs) in CoMP cluster without any CoMP Operation Request from eNBs (or SeNBs). Therefore, the central node (CCN or MeNB) can start a procedure for a CoMP operation even if no eNBs (or SeNBs) within a CoMP cluster request the CoMP operation. In this case, the S801 and S803 steps of FIG. 8 can be omitted.

And, the Information Request message also can be sent to eNBs when eNB status reflected in the 'Information Update' received from eNB requires the CoMP operation.

The eNBs (or SeNBs) within the cluster which have received the Information Request message from the central node (CCN or MeNB) transmits an Information Response message or Failure message to the central node (CCN or MeNB) (S807).

The eNBs (or SeNBs) within the cluster, if transmission of the measured information and/or PF metric is possible, transmits the Information Response message to the central node (CCN or MeNB). The Information Response message includes information indicating that the measured information and/or PF metric can be transmitted.

On the other hand, if transmission of the measured information and/or PF metric is not possible, the eNBs (or SeNBs) within the cluster transmits a Failure message to the central node (CCN or MeNB). The Failure message includes information indicating that the measured information and/or PF metric cannot be transmitted. That is, eNBs (SeNBs) in cluster can inform whether it is possible to report the things requested in 'Information Request' or not. In this way, whether to transmit the measured information and/or PF metric can be determined differently among eNBs.

FIG. 8 assumes that all of the eNBs (or SeNBs) within the cluster transmit the Information Response message to the central node (CCN or MeNB).

Meanwhile, the S807 step, represented by a dotted line, can be omitted.

The eNBs (or SeNBs) which have transmitted the Information Response message transmit the Information Update message to the central node (CCN or MeNB) (S809).

In other words, each of the eNB 2 (or SeNB 2), . . . , eNB n−1 (or SeNB n−1) transmits the measured information and/or PF metric to the central node (CCN or MeNB) through the Information Update message.

At this time, the LOAD INFORMATION message, which is an X2AP protocol message, can be used as a message for transmitting the measured information and/or PF metric.

As detailed above, only the eNB which has transmitted the Information Response message to the central node (CCN or MeNB) at the S807 step can transmit the Information Update message. In case the S807 step is omitted, all of the eNBs (or SeNBs) within the cluster transmit the Information Update message to the central node (CCN or MeNB).

If the measured information and/or PF metric is received from each of the eNBs (or SeNBs) within the CoMP cluster, the central node (CCN or MeNB) coordinates cell resources belonging to the eNBs (or SeNBs) of the CoMP cluster (S811).

The central node (CCN or MeNB) coordinates resources among cells belonging to the eNBs (or SeNBs) within the CoMP cluster based on the measured information and/or PF metric received from the eNBs (or SeNBs) included in the CoMP cluster. The central node (CCN or MeNB) can determine which time-frequency resource or which beam pattern to use when a eNB belonging to the CoMP cluster performs a CoMP operation for the corresponding UE. In other words, the central node can determine how resources are allocated to individual cells while avoiding overlapping of resources used by the respective cells. More specifically, the central node (CCN or MeNB) may coordinate resources to be allocated in every cell that belongs to the CoMP cluster in frequency/time/power/spatial domain. Also, the central node (CCN or MeNB) may determine PRB muting scheduling, RNTP scheduling, ABS pattern scheduling (in power and spatial domain) and PRB power strength scheduling that will be executed in every cell that belongs to the CoMP cluster. Also, the central node (CCN or MeNB) may determine coordination for reference signal configurations, CSI processes and CSI-Interference Measurement (IM) configurations that will be executed in every cell that belongs to the CoMP cluster.

Also, the central node (CCN or MeNB) can determine a CoMP transmission point made of one or more eNBs meant for transmitting data to the corresponding UEs from among eNBs belonging to the CoMP cluster and coordinate resources of the determined CoMP transmission point. In other words, the central node may determine which time-frequency resource or which beam pattern to use for each CoMP transmission point determined.

The central node (CCN or MeNB) which has coordinated resources of the respective cells supposed to perform the CoMP operation transmits a Resource Coordination Result message to inform the respective eNBs of the CoMP cluster about the resource coordination result (S813).

The resource coordination result may include the information of frequency/time/power/spatial domain resource allocations that will be executed in every cell belong to CoMP cluster. Also, the resource coordination result may include the PRB muting scheduling result, RNTP scheduling result, ABS pattern scheduling result (in power and spatial domain), and PRB power strength scheduling result that will be executed in every cell that belongs to the CoMP cluster. Also, the resource coordination result may include coordination result for reference signal configurations, CSI processes and CSI-Interference Measurement (IM) configurations that will be executed in every cell that belongs to the CoMP cluster. In other words, the resource coordination result can include at least one or more of the information listed above.

The resource coordination result can be transmitted periodically or aperiodically. In the case of periodic transmission, the Resource Coordination Result message includes period information meant for informing about the period at which the resource coordination result is transmitted. In the case of aperiodic transmission, the Resource Coordination Result message includes valid time information of the resource coordination result. The resource coordination result can indicate resource coordination information for each PRB within one or more subframes for each cell.

Also, the Resource Coordination Result message can include information about a transmission condition with respect to the measured information and/or PF metric and information about a transmission period of the measured information. In this case, as described above, the eNBs (or EsNBs) within the CoMP cluster can transmit the measured information and/or PF metric to the central node (CCN or MeNB) through the Information Update message each time the corresponding condition is met or according to the transmission period.

The resource coordination result may comprise a hypothetical resource allocation associated with a cell ID, where the cell identified by the cell ID is not necessarily controlled by the receiving eNB.

The resource coordination result which is transmitted to a certain eNB may include the results of resource coordination for all the eNBs (including the certain eNB) that perform the CoMP operation. That is, the resource coordination result may include the results of resource coordination for another eNBs as well as the certain eNB that will perform a CoMP operation through cooperation in addition to information about time-frequency resources or a beam pattern.

Afterwards, resources of the respective eNBs (or SeNBs) within the cluster meant for the CoMP operation are coordinated; each of the eNBs (or SeNBs) within the cluster reports the measured information and/or PF metric periodically or aperiodically to the central node (CCN or MeNB) while the CoMP operation is performed and thus resources employed for the CoMP operation can be re-allocated.

Each of the eNB 1 (or SeNB 1), . . . , eNB n–1 (or SeNB n–1) belonging to the cluster transmits the Information Update message to the central node (CCN or MeNB) (S815).

In other words, each of the eNB 1 (or SeNB 1), . . . , eNB n–1 (or SeNB n–1) transmits the measured information and/or PF metric to the central node (CCN or MeNB) through the Information Update message.

At this time, the LOAD INFORMATION message, which is an X2AP protocol message, can be used as a message to transmit the measured information and/or PF metric.

As described above, the Information Update message can be transmitted periodically or aperiodically. For example, if a transmission period of the measured information and/or PF metric is transmitted through the Information Request message, the eNBs (or SeNBs) belonging to the cluster can transmit the measured information and/or PF metric to the central node (CCN or MeNB) through the Information Update message according to the respective transmission periods. Also, the measured information and/or PF metric can be transmitted aperiodically when there is a request from the central node (CCN or MeNB) or when a particular condition is met.

The central node (CCN or MeNB) can optimize the resources meant for the CoMP operation by adaptively re-allocating the resources used for the CoMP operation based on the measured information and/or PF metric included in the Information Update message transmitted periodically or aperiodically.

Afterwards, the central node (CCN or MeNB), receiving a usage ratio status of resources employed for the CoMP operation from the eNBs (or SeNBs) belonging to the cluster, can determine whether to stop the CoMP operation.

With reference to FIG. 8, the central node (CCN or MeNB) transmits a Resource Status Request message to the eNBs (or SeNBs) belonging to the cluster to request a usage ratio status of resources allocated for the CoMP operation (S817).

The eNBs (or SeNBs) belonging to the cluster which have received the Resource Status Request message transmit a Resource Status Update message to the central node (CCN or MeNB) to report the usage ratio status of the resources designated by CoMP coordination (S819).

The Resource Status Update message can be transmitted periodically or aperiodically. In case the Resource Status Update message is transmitted periodically, transmission period information of the Resource Status Update message can be transmitted being included in the Resource Status Request message. On the other hand, in the case of aperiodic transmission of the Resource Status Update message, the Resource Status Update message can be transmitted in response to the Resource Status Request message.

The central node (CCN or MeNB) can determine whether to stop the CoMP operation by receiving the usage ratio status of the resources allocated for the CoMP operation of the eNBs (or SeNBs) belonging to the CoMP cluster. For example, if the usage ratio status of the resources designated for the CoMP operation in the eNBs (or SeNBs) belonging to the cluster is reduced below a predetermined threshold, the central node (CCN or MeNB) can transmit a message for requesting suspension of the CoMP operation. At this time, the LOAD INFORMATION message can be used as a message for requesting suspension of the CoMP operation.

On the other hand, if a message for requesting suspension of the CoMP operation is received due to the usage ratio status of resources from any one (namely, eNB 1 (or SeNB 1), . . . , eNB n–1 (or SeNB n–1)) of the eNBs (or SeNBs) comprising the CoMP cluster, the central node (CCN or MeNB) delivers the corresponding message to other eNBs (or SeNBs) constituting the CoMP cluster, thereby stopping the CoMP operation.

In what follows, distributed CoMP architecture will be described.

The distributed CoMP operates between neighbouring two eNBs. For the distributed CoMP architecture, two kinds of methods, one-way signalling procedure and two-way signalling procedure. Two methods are distinguished in point of whether eNBs operate through direct feedback between themselves or through indirect feedback. In the following, a one-way signaling procedure will be described with reference to FIG. 9, and two-way signaling procedure will be described with reference to FIG. 10.

FIGS. 9 and 10 assume that the eNB 1 and the eNB 2 forms a cluster for CoMP coordination (i.e., CoMP cluster/CoMP cooperating set), and the eNB 2 is the node which determines a CoMP operation. At this time, a signaling procedure for distributed CoMP architecture according to the present invention can be applied equally to the case where the eNB 1 and 2 are all MeNBs or SeNBs; and to the case where either of the two is an MeNB and the other is an SeNB.

FIG. 9 illustrates a distributed signaling procedure for inter-eNB CoMP according to one embodiment of the present invention.

With reference to FIG. 9, a UE transmits a MEASUREMENT REPORT to the eNB 1 (or SeNB 1) to which the UE belongs (S901).

As described above, the UE measures channel state/statistical information with respect to a cell included in a CoMP measurement set and reports the measurement result to a serving eNB (namely, eNB 1).

The eNB 1 transmits a CoMP Operation Request message to request the eNB 2 to perform a CoMP operation (S903).

A message meant for requesting initiation of a CoMP operation can be transmitted periodically or aperiodically or according to the occurrence of events. In this case, a LOAD INFORMATION message, which is an X2AP protocol message, can be used as a message to request initiation of a CoMP operation.

Based on the MEASUREMENT REPORT message received from a UE, the eNB 1 (or SeNB 1) determines whether to request a CoMP operation. In other words, based on CSI measurement of points included in a CoMP measurement set, the eNB 1 can determine whether to request a CoMP operation. If an eNB feels severe DL interferences from neighbour cells, it may invoke its neighbor eNB to start the CoMP operation.

When requesting the CoMP operation, the sending eNB (i.e., eNB 1) can include the measured information (e.g. CSI, RSRP, SRS received power, User perceived throughput, etc.) and/or the PF metric of individual UE in the message.

In case the CoMP Operation Request message does not include the measured information and/or PF metric, the eNB 2 can request the eNB 1 to transmit the measured information and/or PF metric to the eNB 2. And if the eNB 1 receives a request from the eNB2 for the measured information and/or PF metric, the eNB 1 can transmit the measured information and/or PF metric to the eNB 2. In other words, the S705 and S707 step of FIG. 7 or S805 to S809 steps of FIG. 8 can be carried out in the same manner after the S903 step.

Receiving the CoMP Operation Request message from the eNB 1, a neighbor eNB, the eNB 2 coordinates its resources meant for the CoMP operation (S905).

In other words, the eNB 2 coordinates resources of a cell meant for the CoMP operation, where the cell belong to the eNB 2, and the coordination is based on the measured information and/or PF metric received from the eNB 1. At the time of performing the CoMP operation for the corresponding UE together with the eNB 1, the eNB 2 can determine which time-frequency resource or which beam pattern to use for the respective cells which belong to the eNB 2. More specifically, the eNB 2 may coordinate resources to be allocated in every cell that belongs to the eNB 2 in frequency/time/power/spatial domain. Also, the eNB 2 may determine PRB muting scheduling, RNTP scheduling, ABS pattern scheduling (in power and spatial domain) and PRB power strength scheduling that will be executed in every cell that belongs to the eNB 2. Also, the eNB 2 may determine coordination for reference signal configurations, CSI processes and CSI-Interference Measurement (IM) configurations that will be executed in every cell that belongs to the eNB 2.

Then, the eNB 2 that received the CoMP Operation Request message coordinates its resource for the CoMP operation, and does not send any message to the eNB 1 that sent the CoMP Operation Request message. In other words, the eNB 2 may provide a service to the corresponding UE according to the resource coordination result of the eNB 2; however, the resource coordination result is not provided to the eNB 1. For example, the eNB 2 may transmit or receive data to and from a UE by using only the time-frequency resources not occupied by the eNB 1; for the case of time-frequency resources to be used by the eNB 1, the eNB 2 can be muted for the time-frequency resources to be used by the eNB 1, thereby minimizing the interference on the eNB 1.

The procedure from S901 to S905 is repeated until it converges to the optimal status. In what follows, the procedure will be described in detail.

UE served by the eNB that sent the CoMP Operation Request reports its eNB the measurement results regarding interferences from the neighbour eNB that received the CoMP Operation Request message (S907).

The eNB 1 which has received a Measurement Report from the UE transmits again the CoMP Operation Request message to request the eNB 2, the neighbor eNB, to perform the CoMP operation (S909).

In other words, to re-coordinate (optimize) the resources used for the CoMP operation, the eNB 1 transmits the CoMP Operation Request message to the eNB 2. When requesting the CoMP operation, the sending eNB (i.e., eNB 1) can include the measured information (e.g. CSI, RSRP, SRS received power, User perceived throughput, etc.) and/or the PF metric of individual UE in the message.

Next, in the same way as the S905, the eNB 2 needs to coordinate resources of the eNB 2. And the eNB which has received the CoMP Operation Request message coordinates its resource for the CoMP operation, but does not send any message to the eNB which has sent the CoMP Operation Request message.

As described in detail above, until the resource coordination result of the eNB 2 (for example, interference on the eNB 1 and the eNB 2 is minimized or throughput in association with the corresponding UE is maximized) is optimized, the process above is repeated continuously.

FIG. 10 illustrates a distributed signaling procedure for inter-eNB CoMP according to one embodiment of the present invention.

With reference to FIG. 10, the UE transmits a MEASUREMENT REPORT to the eNB 1 to which the UE belongs (S1101).

As described above, the UE measures channel state/statistical information with respect to a cell included in a CoMP measurement set and reports the measurement result to a serving eNB (namely, eNB 1).

The eNB 1 transmits a CoMP Operation Request message to request the eNB 2 to perform a CoMP operation (S1103).

A message meant for requesting initiation of a CoMP operation can be transmitted periodically or aperiodically or according to the occurrence of events. In this case, a LOAD INFORMATION message, which is an X2AP protocol message, can be used as a message to request initiation of a CoMP operation.

Based on the MEASUREMENT REPORT message received from a UE, the eNB 1 determines whether to request a CoMP operation. In other words, based on CSI measurement of points included in a CoMP measurement set, the eNB 1 can determine whether to request a CoMP operation. If an eNB feels severe DL interferences from neighbor cells, it may invoke its neighbor eNB to start the CoMP operation.

When requesting the CoMP operation, the sending eNB (i.e., eNB 1) can include the measured information (e.g. CSI, RSRP, SRS received power, User perceived throughput, etc.) and/or the PF metric of individual UE in the message.

In case the CoMP Operation Request message does not include the measured information and/or PF metric, the eNB 2 can request the eNB 1 to transmit the measured information and/or PF metric to the eNB 2. And if the eNB 1 receives a request from the eNB2 for the measured information and/or PF metric, the eNB 1 can transmit the measured information and/or PF metric to the eNB 2. In other words, the S705 and S707 step of FIG. 7 or S805 to S809 steps of FIG. 8 can be carried out in the same manner after the S1003 step.

Receiving the CoMP Operation Request message from the eNB 1, a neighbor eNB, the eNB 2 coordinates its resources meant for the CoMP operation (S1005).

In other words, the eNB 2 coordinates resources of a cell meant for the CoMP operation, where the cell belong to the eNB 2, and the coordination is based on the measured information and/or PF metric received from the eNB 1. More specifically, the eNB 2 may coordinate resources to be allocated in every cell that belongs to the eNB 2 in frequency/time/power/spatial domain. Also, the eNB 2 may determine PRB muting scheduling, RNTP scheduling, ABS pattern scheduling (in power and spatial domain) and PRB power strength scheduling that will be executed in every cell that belongs to the eNB 2. Also, the eNB 2 may determine coordination for reference signal configurations, CSI processes and CSI-Interference Measurement (IM) configurations that will be executed in every cell that belongs to the eNB 2.

Also, it would be optional for the eNB to coordinate resources of the source eNB that sent the CoMP Operation Request.

In other words, the eNB 2 can determine which time-frequency resource or which beam pattern to use when the eNB and the eNB 2 perform the CoMP operation for the corresponding UE. In other words, the central node can determine how resources are allocated to individual cells while avoiding overlapping of resources used by the respective cells. More specifically, the eNB 2 may coordinate resources to be allocated in every cell that belongs to the two eNBs (eNB 1 and eNB 2) in frequency/time/power/spatial domain. Also, the eNB 2 may determine PRB muting scheduling, RNTP scheduling, ABS pattern scheduling (in power and spatial domain) and PRB power strength scheduling that will be executed in every cell that belongs to the two eNBs (eNB 1 and eNB 2). Also, the eNB 2 may determine coordination for reference signal configurations, CSI processes and CSI-Interference Measurement (IM) configurations that will be executed in every cell that belongs to the two eNBs (eNB 1 and eNB 2).

The eNB 2, which has coordinated the resources of a cell belonging to the eNB 2 meant for the CoMP operation, transmits a Resource Coordination Result message to the eNB 1 to inform the eNB about the resource coordination result (S1007).

The resource coordination result may include the information of frequency/time/power/spatial domain resource allocations in eNB 2. Also, the resource coordination result may include the PRB muting scheduling result, RNTP scheduling result, ABS pattern scheduling result (in power and spatial domain), and PRB power strength scheduling result that will be executed in every cell that belongs to the eNB 2. Also, the resource coordination result may include coordination result for reference signal configurations, CSI processes and CSI-Interference Measurement (IM) configurations that will be executed in every cell that belongs to eNB 2. In other words, the resource coordination result can include at least one or more of the information listed above.

In case the eNB 2 coordinates resources of the cells belonging to the eNB 1 and the eNB 2 in the previous S1005 step, the eNB 2 can inform the eNB 1 about the resource coordination result of the eNB 1 and the eNB 2 through the Resource Coordination Result message. In other words, optionally, the eNB would include the resource coordination result for the source eNB that sent the CoMP Operation Request in this message.

In this case, the resource coordination result may include the information of frequency/time/power/spatial domain resource allocations that will be executed in the two eNBs (eNB 1 and eNB 2). Also, the resource coordination result may include the PRB muting scheduling result, RNTP scheduling result, ABS pattern scheduling result (in power and spatial domain), and PRB power strength scheduling result that will be executed in every cell that belongs to the two eNBs (eNB 1 and eNB 2). Also, the resource coordination result may include coordination result for reference signal configurations, CSI processes and CSI-Interference Measurement (IM) configurations that will be executed in every cell that belongs to the two eNBs (eNB 1 and eNB 2). In other words, the resource coordination result can include at least one or more of the information listed above.

The resource coordination result can be transmitted periodically or aperiodically. In the case of periodic transmission, the Resource Coordination Result message includes period information meant for informing about the period at which the resource coordination result is transmitted. In the case of aperiodic transmission, the Resource Coordination Result message includes valid time information of the resource coordination result. The resource coordination result can indicate resource coordination information for each PRB within one or more subframes for each cell.

Also, the Resource Coordination Result message can include information about a transmission condition with respect to the measured information and/or PF metric and information about a transmission period of the measured information. In this case, as described above, the eNBs (or EsNBs) within the CoMP cluster can transmit the measured information and/or PF metric to the central node (CCN or MeNB) through the Information Update message each time the corresponding condition is met or according to the transmission period.

The resource coordination result may comprise a hypothetical resource allocation associated with a cell ID, where the cell identified by the cell ID is not necessarily controlled by the receiving eNB.

Afterwards, resources of eNBs (namely, the eNB 1 and the eNB 2) for the CoMP operation are coordinated; while the CoMP operation is carried out, the eNB 1 reports the measured information and/or PF metric to the eNB 2 periodically or aperiodically, thereby re-allocating the resources used for the CoMP operation.

The eNB 1 transmits an Information Update message to the eNB 2 (S1009).

In other words, the eNB 1 transmits the measured information and/or PF metric through the Information Update message.

At this time, a LOAD INFORMATION message, which is an X2AP protocol message, can be used as a message for transmitting the measured information and/or PF metric.

As described in detail above, the Information Update message can be transmitted periodically or aperiodically. For example, if a transmission period of the measured information and/or PF metric is transmitted through the Information Request message, the eNB 1 can transmit the measured information and/or PF metric to the eNB 2 through the Information Update message according to the corresponding transmission period. Also, the measured information and/or PF metric can be transmitted aperiodically when there is a request from the eNB 2 or when a particular condition is met.

The eNB 2 can optimize the resources meant for the CoMP operation by adaptively re-allocating the resources used for the CoMP operation based on the measured information and/or PF metric included in the Information Update message transmitted periodically or aperiodically.

Afterwards, the eNB 2, receiving a usage ratio status of resources employed for the CoMP operation from the eNB 1, can determine whether to stop the CoMP operation.

With reference to FIG. 10, the eNB 2 transmits a Resource Status Request message to the eNB 1 to request usage ratio status of the resources designated for the CoMP operation (S1011).

The eNB 1, having received the Resource Status Request message, transmits a Resource Status Update message to the eNB 2 to report the usage ratio status of the resources designated through the CoMP coordination (S1013).

The Resource Status Update message can be transmitted periodically or aperiodically. In case the Resource Status Update message is transmitted periodically, transmission period information of the Resource Status Update message can be transmitted being included in the Resource Status Request message. On the other hand, in the case of aperiodic transmission, the Resource Status Update message can be transmitted as a response to the Resource Status Request message.

The eNB 2 can determine whether to stop the CoMP operation by receiving the usage ratio status of the resources designated for the CoMP operation in the eNB 1. For example, if the usage ratio status of the resources designated for the CoMP operation in the eNB 1 is reduced below a predetermined threshold, the eNB 2 can transmit a message for requesting suspension of the CoMP operation. On the other hand, the eNB 1 may stop the CoMP operation by transmitting a message for requesting suspension of the CoMP operation to the eNB 2 by taking account of usage ratio status. In this case, the LOAD INFORMATION message can be used as a message to request suspension of the CoMP operation.

Apparatus for Implementing the Present Invention

FIG. 11 is a block diagram of a wireless communication apparatus according to an embodiment of the present invention.

Referring to FIG. 11, a wireless communication system includes a eNB 1110 and a plurality of UEs 1120 belonging to the eNB 1110. The eNB 1110 include both the aforementioned MeNB and SeNB.

The eNB 1110 includes a processor 1111, a memory 1112, a radio frequency (RF) unit 1113. The processor 1111 may be configured to implement the functions, procedures and/or methods proposed by the present invention as described in FIGS. 1-10. Layers of a wireless interface protocol may be implemented by the processor 1111. The memory 1112 is connected to the processor 1111 and stores various types of information for operating the processor 1111. The RF unit 1113 is connected to the processor 1111, transmits and/or receives an RF signal.

The UE 1120 includes a processor 1121, a memory 1122, and an RF unit 1123. The processor 1121 may be configured to implement the functions, procedures and/or methods proposed by the present invention as described in FIGS. 1-10. Layers of a wireless interface protocol may be implemented by the processor 1121. The memory 1122 is connected to the processor 1111 and stores information related to operations of the processor 1122. The RF unit 1123 is connected to the processor 1111, transmits and/or receives an RF signal.

The memories 1112 and 1122 may be located inside or outside the processors 1111 and 1121 and may be connected to the processors 1111 and 1121 through various well-known means. The eNB 1110 and/or UE 1120 may include a single antenna or multiple antennas.

INDUSTRIAL APPLICABILITY

A method for performing a CoMP operation in a wireless communication system according to the present invention has been described with an example intended for the 3GPP LTE/LTE-A system, but the method can be applied equally to various types of wireless communication systems in addition to the 3GPP LTE/LTE-A system.

The invention claimed is:

1. A method for performing an Inter-eNB CoMP (Coordinated Multi-Point) operation in a wireless communication system, comprising:
   receiving, by a first eNB, a message requesting initiation of a CoMP operation from a second eNB;
   transmitting, by the first eNB, to the second eNB a message requesting information about gain expected from a CoMP operation performed in the second eNB;
   receiving, by the first eNB, the information about gain expected from the second eNB;
   coordinating, by the first eNB, resources for a CoMP operation based on the information of expected gain; and
   transmitting, by the first eNB, the resource coordination result to the second eNB.

2. The method of claim 1, wherein the first eNB transmits a transmission period of the information about expected gain or information about a transmission condition together while requesting the second eNB for the information about expected gain.

3. The method of claim 2, wherein, if the first eNB receives again the information about expected gain, resources for the CoPM operation are coordinated again.

4. The method of claim 1, further comprising:
   transmitting, by the first eNB, a message for requesting a usage ratio status of resources for the CoMP operation to the second eNB; and
   receiving, by the first eNB, a usage ratio status of resources for the CoMP operation from the second eNB.

5. The method of claim 4, further comprising:
   Determining, by the first eNB, whether to stop the CoMP operation based on a usage ratio status of resources for the CoMP operation.

6. The method of claim 5, further comprising:
   if a usage ratio status of resources for the CoMP operation is reduced below a predetermined threshold, transmitting, by the first eNB, a message requesting stopping of the CoMP operation to the second eNB.

7. The method of claim 1, wherein the resource coordination result includes at least one of information of frequency/time/power/spatial domain resource allocations, the physical resource block (PRB) muting scheduling result, relative narrowband transmit power (RNTP) scheduling result, almost blank sub-frames (ABS) pattern scheduling result, PRB power strength scheduling result and coordination for reference signal configurations, Channel State Information (CSI) processes, and CSI-Interference Measurement (IM) configurations of the first and the second eNBs supposed to perform the CoMP operation.

8. The method of claim 1, further comprising:
   transmitting, by the first eNB, a message requesting the second eNB for measurement information; and
   receiving, by the first eNB, the measurement information from the second eNB.

9. The method of claim 8, wherein the measurement information includes at least one of Channel Stat Information (CSI), Reference Signal Received Power (RSRP), SRS received power, and User perceived throughput.

10. A first eNB for performing an Inter-eNB CoMP operation in a wireless communication system, the first eNB comprising:
    a Radio Frequency (RF) unit configured to transmit and receive a radio signal; and
    a processor,
    wherein the processor is configured to:
    receive a message requesting initiation of a CoMP operation from a second eNB,
    transmit to the second eNB a message requesting information about expected gain when a CoMP operation is carried out in the second eNB,
    receive the information about expected gain from the second eNB,
    coordinate resources for a CoMP operation based on the information about expected gain, and
    transmit the resource coordination result to the second eNB.

* * * * *